(12) United States Patent
Addison et al.

(10) Patent No.: US 12,374,128 B2
(45) Date of Patent: Jul. 29, 2025

(54) NON-CONTACT DEPTH SENSING MONITORING IN VEHICLES

(71) Applicant: Covidien LP, Mansfield, MA (US)

(72) Inventors: Paul S. Addison, Edingburgh (GB); Michael Addison, Edinburgh (GB); Dean Montgomery, Edinburgh (GB)

(73) Assignee: Covidien LP, Mansfield, MA (US)

( * ) Notice: Subject to any disclaimer, the term of this patent is extended or adjusted under 35 U.S.C. 154(b) by 348 days.

(21) Appl. No.: 17/933,366

(22) Filed: Sep. 19, 2022

(65) Prior Publication Data

US 2023/0196797 A1 Jun. 22, 2023

Related U.S. Application Data

(60) Provisional application No. 63/291,964, filed on Dec. 21, 2021.

(51) Int. Cl.
*G06V 20/59* (2022.01)
*G06T 7/50* (2017.01)
*G06T 7/70* (2017.01)
*G06V 40/16* (2022.01)

(52) U.S. Cl.
CPC ............... *G06V 20/59* (2022.01); *G06T 7/50* (2017.01); *G06T 7/70* (2017.01); *G06V 40/172* (2022.01); *G06T 2207/30196* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 5,107,845 | A | 4/1992 | Guern et al. |
| 5,408,998 | A | 4/1995 | Mersch |
| 5,704,367 | A | 1/1998 | Ishikawa et al. |
| 5,800,360 | A | 9/1998 | Kisner et al. |
| 5,995,856 | A | 11/1999 | Mannheimer et al. |
| 6,241,684 | B1 | 6/2001 | Amano et al. |
| 6,668,071 | B1 | 12/2003 | Minkin et al. |
| 6,920,236 | B2 | 7/2005 | Prokoski |

(Continued)

FOREIGN PATENT DOCUMENTS

| | | |
|---|---|---|
| CA | 2234191 A1 | 10/1998 |
| CN | 106725410 A | 5/2017 |

(Continued)

OTHER PUBLICATIONS

"European Search Report", European Application No. 17156334.9, Applicant: Covidien LP, Aug. 23, 2017, 10 pages.

(Continued)

*Primary Examiner* — Delomia L Gilliard
(74) *Attorney, Agent, or Firm* — Draft Masters IP, LLC

(57) ABSTRACT

System and methods for non-contact monitoring in vehicles are described. The systems and methods may use depth sensing cameras as part of the non-contact monitoring system. In some embodiments, depth data from at least one depth sensing device that has a field of view of at least part of the interior of the vehicle is received, wherein the depth data represents depth information as a function of position across the field of view. The depth data is then processed to obtain further information related to the occupant within the vehicle.

20 Claims, 9 Drawing Sheets

(56) References Cited

U.S. PATENT DOCUMENTS

| | | | |
|---|---|---|---|
| 7,431,700 B2 | 10/2008 | Aoki et al. | |
| 7,558,618 B1 | 7/2009 | Williams | |
| 8,149,273 B2 | 4/2012 | Liu et al. | |
| 8,754,772 B2 | 6/2014 | Horng et al. | |
| 8,792,969 B2 | 7/2014 | Bernal et al. | |
| 8,971,985 B2 | 3/2015 | Bernal et al. | |
| 9,226,691 B2 | 1/2016 | Bernal et al. | |
| 9,282,725 B2 | 3/2016 | Jensen-Jarolim et al. | |
| 9,301,710 B2 | 4/2016 | Mestha et al. | |
| 9,402,601 B1 | 8/2016 | Berger et al. | |
| 9,436,984 B2 | 9/2016 | Xu et al. | |
| 9,443,289 B2 | 9/2016 | Xu et al. | |
| 9,504,426 B2 | 11/2016 | Kyal et al. | |
| 9,508,141 B2 | 11/2016 | Khachaturian et al. | |
| 9,607,138 B1 * | 3/2017 | Baldwin | H04W 12/06 |
| 9,662,022 B2 | 5/2017 | Kyal et al. | |
| 9,693,693 B2 | 7/2017 | Farag et al. | |
| 9,693,710 B2 | 7/2017 | Mestha et al. | |
| 9,697,599 B2 | 7/2017 | Prasad et al. | |
| 9,750,461 B1 | 9/2017 | Telfort | |
| 9,839,756 B2 | 12/2017 | Klasek | |
| 9,943,371 B2 | 4/2018 | Bresch et al. | |
| 10,213,540 B2 | 2/2019 | Burbank et al. | |
| 10,278,585 B2 | 5/2019 | Ferguson et al. | |
| 10,376,147 B2 | 8/2019 | Wood et al. | |
| 10,398,353 B2 | 9/2019 | Addison et al. | |
| 10,447,972 B2 | 10/2019 | Patil | |
| 10,489,912 B1 | 11/2019 | Brailovskiy | |
| 10,523,852 B2 | 12/2019 | Tzvieli et al. | |
| 10,588,779 B2 | 3/2020 | Vorhees et al. | |
| 10,589,916 B2 | 3/2020 | McRae | |
| 10,650,585 B2 | 5/2020 | Kiely | |
| 10,667,723 B2 | 6/2020 | Jacquel et al. | |
| 10,702,188 B2 | 7/2020 | Addison et al. | |
| 10,729,357 B2 | 8/2020 | Larson et al. | |
| 10,874,331 B2 | 12/2020 | Kaiser et al. | |
| 10,937,296 B1 | 3/2021 | Kukreja et al. | |
| 10,939,824 B2 | 3/2021 | Addison et al. | |
| 10,939,834 B2 | 3/2021 | Khwaja et al. | |
| 10,966,059 B1 | 3/2021 | Dayal et al. | |
| 11,311,252 B2 | 4/2022 | Jacquel et al. | |
| 11,315,275 B2 | 4/2022 | Addison et al. | |
| 11,317,828 B2 | 5/2022 | Addison et al. | |
| 11,350,850 B2 | 6/2022 | Jacquel et al. | |
| 11,850,026 B2 | 12/2023 | Levi et al. | |
| 2002/0137464 A1 | 9/2002 | Dolgonos et al. | |
| 2004/0001633 A1 | 1/2004 | Caviedes | |
| 2004/0258285 A1 | 12/2004 | Hansen et al. | |
| 2005/0203348 A1 | 9/2005 | Shihadeh et al. | |
| 2007/0116328 A1 | 5/2007 | Sablak et al. | |
| 2008/0001735 A1 | 1/2008 | Tran | |
| 2008/0108880 A1 | 5/2008 | Young et al. | |
| 2008/0279420 A1 | 11/2008 | Masticola et al. | |
| 2008/0295837 A1 | 12/2008 | McCormick et al. | |
| 2009/0024012 A1 | 1/2009 | Li et al. | |
| 2009/0141124 A1 | 6/2009 | Liu et al. | |
| 2009/0304280 A1 | 12/2009 | Aharoni et al. | |
| 2010/0210924 A1 | 8/2010 | Parthasarathy et al. | |
| 2010/0236553 A1 | 9/2010 | Jafari et al. | |
| 2010/0249630 A1 | 9/2010 | Droitcour et al. | |
| 2010/0324437 A1 | 12/2010 | Freeman et al. | |
| 2011/0144517 A1 | 6/2011 | Cervantes | |
| 2011/0150274 A1 | 6/2011 | Patwardhan et al. | |
| 2012/0065533 A1 | 3/2012 | Carrillo et al. | |
| 2012/0075464 A1 | 3/2012 | Derenne et al. | |
| 2012/0195473 A1 | 8/2012 | De Haan et al. | |
| 2012/0243797 A1 | 9/2012 | Di Venuto Dayer et al. | |
| 2013/0073312 A1 | 3/2013 | Thompson et al. | |
| 2013/0267873 A1 | 10/2013 | Fuchs | |
| 2013/0271591 A1 | 10/2013 | Van Leest et al. | |
| 2013/0272393 A1 | 10/2013 | Kirenko et al. | |
| 2013/0275873 A1 | 10/2013 | Shaw et al. | |
| 2013/0324830 A1 | 12/2013 | Bernal et al. | |
| 2013/0324876 A1 | 12/2013 | Bernal et al. | |
| 2014/0023235 A1 | 1/2014 | Cennini et al. | |
| 2014/0052006 A1 | 2/2014 | Lee et al. | |
| 2014/0053840 A1 | 2/2014 | Liu | |
| 2014/0073860 A1 * | 3/2014 | Urtti | A61B 5/746 600/300 |
| 2014/0139405 A1 | 5/2014 | Ribble et al. | |
| 2014/0140592 A1 | 5/2014 | Lasenby et al. | |
| 2014/0235976 A1 | 8/2014 | Bresch et al. | |
| 2014/0267718 A1 | 9/2014 | Govro et al. | |
| 2014/0272860 A1 | 9/2014 | Peterson et al. | |
| 2014/0275832 A1 | 9/2014 | Muehlsteff et al. | |
| 2014/0276104 A1 | 9/2014 | Tao et al. | |
| 2014/0330336 A1 | 11/2014 | Errico et al. | |
| 2014/0334697 A1 | 11/2014 | Kersten et al. | |
| 2014/0358017 A1 | 12/2014 | Op Den Buijs et al. | |
| 2014/0378810 A1 | 12/2014 | Davis et al. | |
| 2014/0379369 A1 | 12/2014 | Kokovidis et al. | |
| 2015/0003723 A1 | 1/2015 | Huang et al. | |
| 2015/0068069 A1 | 3/2015 | Tran et al. | |
| 2015/0094597 A1 | 4/2015 | Mestha et al. | |
| 2015/0131880 A1 | 5/2015 | Wang et al. | |
| 2015/0157269 A1 | 6/2015 | Lisogurski et al. | |
| 2015/0198707 A1 | 7/2015 | Al-Alusi | |
| 2015/0223731 A1 | 8/2015 | Sahin | |
| 2015/0238150 A1 | 8/2015 | Subramaniam | |
| 2015/0265187 A1 | 9/2015 | Bernal et al. | |
| 2015/0282724 A1 | 10/2015 | McDuff et al. | |
| 2015/0286779 A1 | 10/2015 | Bala et al. | |
| 2015/0301590 A1 | 10/2015 | Furst et al. | |
| 2015/0317814 A1 | 11/2015 | Johnston et al. | |
| 2015/0379370 A1 | 12/2015 | Clifton et al. | |
| 2016/0000335 A1 | 1/2016 | Khachaturian et al. | |
| 2016/0049094 A1 | 2/2016 | Gupta et al. | |
| 2016/0082222 A1 | 3/2016 | Garcia Molina et al. | |
| 2016/0140828 A1 | 5/2016 | Deforest | |
| 2016/0143598 A1 | 5/2016 | Rusin et al. | |
| 2016/0151022 A1 | 6/2016 | Berlin et al. | |
| 2016/0156835 A1 | 6/2016 | Ogasawara et al. | |
| 2016/0174887 A1 | 6/2016 | Kirenko et al. | |
| 2016/0210747 A1 | 7/2016 | Hay et al. | |
| 2016/0235344 A1 | 8/2016 | Auerbach | |
| 2016/0310084 A1 | 10/2016 | Banerjee et al. | |
| 2016/0317041 A1 | 11/2016 | Porges et al. | |
| 2016/0345931 A1 | 12/2016 | Xu et al. | |
| 2016/0367186 A1 | 12/2016 | Freeman et al. | |
| 2017/0007342 A1 | 1/2017 | Kasai et al. | |
| 2017/0007795 A1 | 1/2017 | Pedro et al. | |
| 2017/0055877 A1 | 3/2017 | Niemeyer | |
| 2017/0065484 A1 | 3/2017 | Addison et al. | |
| 2017/0071516 A1 | 3/2017 | Bhagat et al. | |
| 2017/0095215 A1 | 4/2017 | Watson et al. | |
| 2017/0095217 A1 | 4/2017 | Hubert et al. | |
| 2017/0119340 A1 | 5/2017 | Nakai et al. | |
| 2017/0147772 A1 | 5/2017 | Meehan et al. | |
| 2017/0164904 A1 | 6/2017 | Kirenko | |
| 2017/0172434 A1 | 6/2017 | Amelard et al. | |
| 2017/0173262 A1 | 6/2017 | Veltz | |
| 2017/0238805 A1 | 8/2017 | Addison et al. | |
| 2017/0238842 A1 | 8/2017 | Jacquel et al. | |
| 2017/0311887 A1 | 11/2017 | Leussler et al. | |
| 2017/0319114 A1 | 11/2017 | Kaestle | |
| 2018/0042486 A1 | 2/2018 | Yoshizawa et al. | |
| 2018/0042500 A1 | 2/2018 | Liao et al. | |
| 2018/0049669 A1 | 2/2018 | Vu et al. | |
| 2018/0053392 A1 | 2/2018 | White et al. | |
| 2018/0104426 A1 | 4/2018 | Oldfield et al. | |
| 2018/0106897 A1 | 4/2018 | Shouldice et al. | |
| 2018/0169361 A1 | 6/2018 | Dennis et al. | |
| 2018/0217660 A1 | 8/2018 | Dayal et al. | |
| 2018/0228381 A1 | 8/2018 | Leboeuf et al. | |
| 2018/0303351 A1 | 10/2018 | Mestha et al. | |
| 2018/0310844 A1 | 11/2018 | Tezuka et al. | |
| 2018/0325420 A1 | 11/2018 | Gigi | |
| 2018/0330178 A1 * | 11/2018 | el Kaliouby | G16H 50/20 |
| 2018/0333050 A1 | 11/2018 | Greiner et al. | |
| 2018/0333102 A1 * | 11/2018 | De Haan | A61B 5/7214 |
| 2018/0352150 A1 | 12/2018 | Purwar et al. | |
| 2019/0050985 A1 | 2/2019 | Den Brinker et al. | |
| 2019/0133499 A1 | 5/2019 | Auerbach | |
| 2019/0142274 A1 | 5/2019 | Addison et al. | |

(56) References Cited

U.S. PATENT DOCUMENTS

| | | |
|---|---|---|
| 2019/0199970 A1 | 6/2019 | Greiner et al. |
| 2019/0209046 A1 | 7/2019 | Addison et al. |
| 2019/0209083 A1 | 7/2019 | Wu et al. |
| 2019/0307365 A1 | 10/2019 | Addison et al. |
| 2019/0311101 A1 | 10/2019 | Nienhouse |
| 2019/0343480 A1 | 11/2019 | Shute et al. |
| 2019/0380599 A1 | 12/2019 | Addison et al. |
| 2019/0380807 A1 | 12/2019 | Addison et al. |
| 2020/0046302 A1 | 2/2020 | Jacquel et al. |
| 2020/0187827 A1 | 6/2020 | Addison et al. |
| 2020/0202154 A1 | 6/2020 | Wang et al. |
| 2020/0205734 A1 | 7/2020 | Mulligan et al. |
| 2020/0237225 A1 | 7/2020 | Addison et al. |
| 2020/0242790 A1 | 7/2020 | Addison et al. |
| 2020/0250406 A1 | 8/2020 | Wang et al. |
| 2020/0253560 A1 | 8/2020 | De Haan |
| 2020/0279464 A1 | 9/2020 | Llewelyn |
| 2020/0289024 A1 | 9/2020 | Addison et al. |
| 2020/0329976 A1 | 10/2020 | Chen et al. |
| 2020/0409383 A1 | 12/2020 | Maunder |
| 2021/0068670 A1 | 3/2021 | Redtel |
| 2021/0142874 A1 | 5/2021 | Llewelyn |
| 2021/0153746 A1 | 5/2021 | Addison et al. |
| 2021/0201517 A1 | 7/2021 | Yang et al. |
| 2021/0233631 A1 | 7/2021 | Llewelyn |
| 2021/0235992 A1 | 8/2021 | Addison |
| 2021/0295662 A1 | 9/2021 | Bugbee et al. |
| 2021/0313075 A1 | 10/2021 | McNamara et al. |
| 2022/0211296 A1 | 7/2022 | Addison et al. |
| 2023/0030426 A1* | 2/2023 | Glazman ............... B60R 21/015 |
| 2023/0122367 A1 | 4/2023 | Tesar |
| 2024/0087165 A1* | 3/2024 | Friedman ............. G06V 20/593 |

FOREIGN PATENT DOCUMENTS

| | | |
|---|---|---|
| CN | 111728602 A | 10/2020 |
| CN | 112233813 A | 1/2021 |
| DE | 19741982 A1 | 10/1998 |
| EP | 2793189 B1 | 11/2016 |
| EP | 2428162 B1 | 8/2017 |
| EP | 3207862 A1 | 8/2017 |
| EP | 3207863 A1 | 8/2017 |
| EP | 3384827 A1 | 10/2018 |
| EP | 2772828 B1 | 1/2019 |
| JP | 2004173010 A | 6/2004 |
| JP | 2004283373 A | 10/2004 |
| JP | 3744778 B2 | 12/2005 |
| JP | 2009544080 A | 12/2009 |
| JP | 2011130996 A | 7/2011 |
| KR | 101644843 B1 | 8/2016 |
| RS | 20120373 A1 | 4/2014 |
| WO | 2004100067 A2 | 11/2004 |
| WO | 2005079658 A2 | 9/2005 |
| WO | 2010034107 A1 | 4/2010 |
| WO | 2010036653 A1 | 4/2010 |
| WO | 2015059700 A1 | 4/2015 |
| WO | 2015078735 A1 | 6/2015 |
| WO | 2015110859 A1 | 7/2015 |
| WO | 2016065411 A1 | 5/2016 |
| WO | 2016178141 A1 | 11/2016 |
| WO | 2016209491 A1 | 12/2016 |
| WO | 2017060463 A1 | 4/2017 |
| WO | 2017089139 A1 | 6/2017 |
| WO | 2017100188 A2 | 6/2017 |
| WO | 2017144934 A1 | 8/2017 |
| WO | 2018042376 A1 | 3/2018 |
| WO | 2019094893 A1 | 5/2019 |
| WO | 2019135877 A1 | 7/2019 |
| WO | 2019240991 A1 | 12/2019 |
| WO | 2020033613 A1 | 2/2020 |
| WO | 2021044240 A1 | 3/2021 |

OTHER PUBLICATIONS

"European Search Report", European Patent Application No. 17156337. 2, Applicant: Covidien LP, Aug. 23, 2017, 10 pages.

"International Search Report and Written Opinion", International Application No. PCT/US2021/015669, Apr. 12, 2021, 15 pages.

"International Search Report and Written Opinion", International Application No. PCT/US2018/060648, Jan. 28, 2019, 17 pages.

"International Search Report and Written Opinion", International Application No. PCT/US2018/065492, Mar. 8, 2019, 12 pages.

"International Search Report and Written Opinion", International Application No. PCT/US2019/035433, Nov. 11, 2019, 17 pages.

"International Search Report and Written Opinion", International Application No. PCT/US2019/045600, Oct. 23, 2019, 19 pages.

"Invitation to Pay Additional Fees and Partial International Search Report", International Application No. PCT/US2019/035433, Sep. 13, 2019, 16 pages.

"Medical Electrical Equipment, Part 2-61: Particular requirements for basic safety and essential performance of pulse oximeter equipment", BSI Standards Publication, BS EN ISO 80601-2-61, 2011, 98 pages.

Aarts, Lonneke A.M., et al., "Non-contact heart rate monitoring utilizing camera photoplethysmography in neonatal intensive care unit—A Pilot Study", Early Human Development 89, 2013, pp. 943-948, 6 pages.

Abbas, A.K., et al., "Neonatal non-contact respiratory monitoring based on real-time infrared thermography", Biomed. Eng. Online, vol. 10, No. 93, 2011, 17 pages.

Addison, Paul S., "A Review of Signal Processing Used in the Implementation of the Pulse Oximetry Photoplethysmographic Fluid Responsiveness Parameter", International Anesthesia Research Society, vol. 119, No. 6, Dec. 2014, pp. 1293-1306, 14 pages.

Addison, Paul S., et al., "Developing an algorithm for pulse oximetry derived respiratory rate (RRoxi): a healthy volunteer study", J Clin comput, No. 26, 2012, pp. 45-51, 7 pages.

Addison, Paul S., et al., "Pulse oximetry-derived respiratory rate in general care floor patients", J. Clin Monit Comput, No. 29, 2015, pp. 113-120, 8 pages.

Addison, P.S., et al., "Video-based Heart Rate Monitoring across a Range of Skin Pigmentations during an Acute Hypoxic Challenge", J Clin Monit Comput, vol. 9, Nov. 9, 2017, 15 pages.

Amazon, "Dockem Koala Tablet Wall Mount Dock for ipad Air/Mini/Pro, Samsung Galaxy Tab/Note, Nexus 7/10, and More (Black Brackets, Screw-in Version)", https://www.amazon.com/Tablet-Dockem-Samsung-Brackets-Version-dp/B00JV75FC6?th=1, First available Apr. 22, 2014, viewed on Nov. 16, 2021, Apr. 22, 2014, 4 pages.

Amelard, et al., "Non-contact transmittance photoplethysmographic imaging (PPGI) for long-distance cardiovascular monitoring", ResearchGate, XP055542534 [Retrieved online Jan. 15, 2019], Mar. 23, 2015, pp. 1-13, 14 pages.

Armanian, A. M., "Caffeine administration to prevent apnea in very premature infants", Pediatrics & Neonatology, 57(5), 2016, pp. 408-412, 5 pages.

Barone, S, et al., "Computer-aided modelling of three-dimensional maxillofacial tissues through multi-modal imaging", Proceedings of the Institution of Mechanical Engineers, Journal of Engineering in Medicine, Part H vol. 227, No. 2, Feb. 1, 2013, 1 page.

Barone, S, et al., "Creation of 3D Multi-body Orthodontic Models by Using Independent Imaging Sensors", Senros MDPI AG Switzerland, vol. 13, No. 2, Jan. 1, 2013, pp. 2033-2050, 18 pages.

Bartula, M., et al., "Camera-based System for Sontactless Monitoring of Respiration", 2013 35th Annual International Conference of the IEEE Engineering in Medicine and Biology Society (EMBC), Jul. 3, 2013, pp. 2672-2675, 4 pages.

Bhattacharya, S., et al., "A Novel Classification Method for Predicting Acute Hypotensive Episodes in Critical Care", 5th ACM Conference on Bioinformatics, Computational Bilogy and Health Informatics (ACM-BCB 2014), Newport Beach, USA, 2014, 10 pages.

Bhattacharya, S., et al., "Unsupervised learning using Gaussian Mixture Copula models", 21st International Conference on Computational Statistics (COMPSTAT 2014), Geneva, Switzerland, 2014, pp. 523-530, 8 pages.

(56) References Cited

OTHER PUBLICATIONS

Bickler, Philip E., et al., "Factors Affecting the Performance of 5 Cerebral Oximeters During Hypoxia in Healthy Volunteers", Society for Technology in Anesthesia, vol. 117, No. 4, Oct. 2013, pp. 813-823, 11 pages.

Bousefsaf, Frederic, et al., "Continuous wavelet filtering on webcam photoplethysmographic signals to remotely assess the instantaneous heart rate", Biomedical Signal Processing and Control, Aug. 2013, pp. 568-574, 7 pages.

Bruser, C., et al., "Adaptive Beat-to-Beat Heart Rate Estimation in Ballistocardiograms", IEEE Transactions Information Technology in Biomedicine, vol. 15, No. 5, Sep. 2011, pp. 778-786, 9 pages.

Cennini, Giovanni, et al., "Heart rate monitoring via remote photoplethysmography with motion artifacts reduction", Optics Express, vol. 18, No. 5, Mar. 1, 2010, pp. 4867-4875, 9 pages.

Colantonio, S., et al., "A smart mirror to promote a healthy lifestyle", Biosystems Engineering. vol. 138, Innovations in Medicine and Healthcare, Oct. 2015, pp. 33-43, 11 pages.

Cooley, et al., "An Alorithm for the Machine Calculation of Complex Fourier Series", Aug. 17, 1964, pp. 297-301, 5 pages.

Di Fiore, J.M., et al., "Intermittent hypoxemia and oxidative stress in preterm infants", Respiratory Physiology & Neurobiology, No. 266, 2019, pp. 121-129, 25 pages.

Fei, J., et al., "Thermistor at a distance: unobtrusive measurement of breathing", IEEE Transactions on Biomedical Engineering, vol. 57, No. 4, 2010, pp. 968-998, 11 pages.

Feng, Litong, et al., "Dynamic ROI based on K-means for remote photoplethysmography", IEE International Conference on Accoustics, Speech and Signal Processing (ICASSP), Apr. 2015, pp. 1310-1314, 5 pages.

Fischer, et al., "ReMoteCare: Health Monitoring with Streaming Video", OCMB '08, 7th International Conference on Mobile Business, IEEE, Piscataway, NJ,, Jul. 7, 2008, pp. 280-286.

George, et al., "Respiratory Rate Measurement From PPG Signal Using Smart Fusion Technique", International Conference on Engineering Trends and Science & Humanities (ICETSH-2015), 2015, 5 pages.

Goldman, L.J., "Nasal airflow and thoracoabdominal motion in children using infrared thermographic video processing", Pediatric Pulmonology, vol. 47, No. 5, 2012, pp. 476-486, 11 pages.

Grimm, T., et al., "Sleep position classification from a depth camera using bed aligned maps", 23rd International Conference on Pattern Recognition (ICPR), Dec. 2016, pp. 319-324, 6 pages.

Gsmarena, "Apple iPad Pro 11 (2018)", https://www.gsmarena.com/apple_ipad_pro_11_(2018)-9386.pjp, viewed on Nov. 16, 2021, 1 page.

Guazzi, Alessandro R., et al., "Non-contact measurement of oxygen saturation with an RGB camera", Biomedical Optics Express, vol. 6, No. 9, Sep. 1, 2015, pp. 3320-3338, 19 pages.

Han, J., et al., "Visible and infrared image registration in man-made environments employing hybrid visuals features", Pattern Recognition Letters, vol. 34, No. 1, 2013, pp. 42-51, 10 pages.

Huddar, V., et al., "Predicting Postoperative Acute Respiratory Failure in Critical Care using Nursing Notes and Physiological Signals", 36th Annual International Conference of IEEE Engineering in Medicine and Biology Society (IEEE EMBC 2014), Chicago, USA, 2014, pp. 2702-2705, 4 pages.

Hyvarinen, A., et al., "Independent Component Analysis: Algorithms and Applications", Neural Networks, vol. 13, No. 4, 2000, pp. 411-430, 31 pages.

Javadi, M., et al., "Diagnosing Pneumonia in Rural Thailand: Digital Cameras versus Film Digitizers for Chest Radiograph Teleradiology", International Journal of Infectious Disease, 10(2), Mar. 2006, pp. 129-135, 7 pages.

Jopling, M. W., et al., "Issues in the Laboratory Evaluation of Pulse Oximeter Performance", Anesth. Analg., No. 94, 2002, pp. S62-S68, 7 pages.

Kastle, Siegfried W., et al., "Determining the Artifact Sensitivity of Recent Pulse Oximeters During Laboratory Benchmarking", Journal of Clinical Monitoring and Computing, vol. 16, No. 7, 2000, pp. 509-552, 14 pages.

Klaessens, J.H.G.M., et al., "Non-invasive skin oxygenation imaging using a multi-spectral camera system: Effectiveness of various concentration algorithms applied on human skin", Proc. of SPIE, vol. 7174 717408-1, 2009, 14 pages.

Kong, Lingqin, et al., "Non-contact detection of oxygen saturation based on visible light imaging device using ambient light", Optics Express, vol. 21, No. 15, Jul. 29, 2013, pp. 17646-17471, 8 pages.

Kortelainen, J.M., et al., "Sleep staging based on signals acquired through bed sensor", IEEE Transactions on Informational Technology in Biomedicine, vol. 14, No. 3, May 2010, pp. 776-785, 10 pages.

Kumar, M., et al., "Distance PPG: Robust non-contact vital signs monitoring using a camera", Biomedical Optics Express, vol. 6, No. 5, May 1, 2015, 24 pages.

Kwon, Sungjun, et al., "Validation of heart rate extraction using video imaging on a built-in camera system of a smartphone", 34th Annual International Conference of the IEEE EMBS, San Diego, CA, USA, Aug. 28-Sep. 1, 2012, op. 2174-2177, 4 pages.

Lai, C.J., et al., "Heated humidified high-flow nasal oxygen prevents intraoperative body temperature decrease in non-intubated thoracoscopy", Journal of Anesthesia, Oct. 15, 2018, 8 pages.

Al-Naji, Ali, et al., "Real Time Apnoea Monitoring of Children Using the Microsoft Kinect Sensor: A Pilot Study", Sensors, 17(286), Feb. 3, 2017, 15 pages.

Harte, James M., et al., "Chest wall motion analysis in healthy volunteers and adults with cystic fibrosis using a novel Kinect-based motion tracking system", Medical & Biological Engineering & Computing, 54(11), Feb. 13, 2016, pp. 1631-1640, 11 pages.

Sokooti, Hess, et al., "Hierarchical Prediction of Registration Misalignment Using a Convolutional LSTM: Application to Chest CT Scans", IEEE Access, IEEE, USA, vol. 9, Apr. 20, 2021, 62008-62020, 13 pages.

Rezaei, Mahdi, et al., "DeepSOCIAL: Social Distancing Monitoring and Infection Risk Assessment in COVID-19 Pandemic", Applied Sciences, vol. 10, 7514, Oct. 26, 2020, pp. 1-29, 29 pages.

Sathyamoorthy, Adarsh Jagan, et al., "COVID-Robot: Monitoring Social Distancing Constraints in Crowded Scenarios", Aug. 21, 2020, pp. 1-11, 11 pages.

Liu, X., et al., "An Image Captioning Method for Infant Sleeping Environment Diagnosis", Springer International Publishing, May 15, 2019, pp. 18-26, 9 pages.

Lawrence, E., et al., "Data Collection, Correlation and Dissemination of Medical Sensor information in a WSN", IEEE 2009 Fifth International Conference on Networking and Services, 978-0-7695-3586-9/09, Apr. 20, 2009, pp. 402-408, 7 pages.

Li, et al., "A Non-Contact Vision-Based System for Respiratory Rate Estimation", IEEE 978-1-4244-7929-0/14, 2014, pp. 2119-2122, 4 pages.

Liu, H., et al., "A Novel Method Based on Two Cameras for Accurate Estimation of Arterial Oxygen Saturation", BioMedical Engineering Online, vol. 14, No. 52, 2015, 18 pages.

Liu, S., et al., "In-bed pose estimation: Deep learning with shallow dataset. IEEE journal of translational engineering in health and medicine", IEEE Journal of Translational Engineering in Health and Medicine, No. 7, 2019, pp. 1-12, 12 pages.

Liu, C., et al., "Motion Magnification", ACM Transactions on Graphics (TOG), vol. 24, No. 3, 2005, pp. 519-526, 8 pages.

Lv, et al., "Class Energy Image Analysis for Video Sensor-Based Gait Recognition: A Review", Sensors, No. 15, 2015, pp. 932-964, 33 pages.

McDuff, Daniel J., et al., "A Survey of Remote Optical Photoplethysmographic Imaging Methods", IEEE 987-1-4244-0270-1/15, 2015, pp. 6398-6404, 7 pages.

Mestha, L.K., et al., "Towards Continuous Monitoring of Pulse Rate in Neonatal Intensive Care Unit with a Webcam", Proc. of 36th Annual Int. Conf. of the IEEE Engineering in Medicine and Biology Society, Chicago, IL, 2014, pp. 3817-3820, 4 pages.

(56) References Cited

OTHER PUBLICATIONS

Mukherjee, S., et al., "Patient health management system using e-health monitoring architecture", IEEE, International Advance Computing Conference (IACC), 978-1-4799-2572-8/14, Feb. 21, 2014, pp. 400-405, 6 pages.
Nguyen, et al., "3D shape, deformation and vibration measurements using infrared Kinect sensors and digital image correlation", Applied Optics, vol. 56, No. 32, Nov. 10, 2017, 8 pages.
Ni, et al., "RGBD-Camera Based Get-Up Event Detection for Hospital Fall Prevention", Acoustics, Speech and Signal Processing (ICASSP) 2012 IEEE International Conf., Mar. 2012, pp. 1405-1408, 6 pages.
Nisar, et al., "Contactless heart rate monitor for multiple persons in a video", IEEE International Conference on Consumer Electronics—Taiwan (ICCE-TW), XP03291229 [Retreived on Jul. 25, 2016], May 27, 2016, 2 pages.
Pereira, C., et al., "Noncontact Monitoring of Respiratory Rate in Newborn Infants Using Thermal Imaging", IEEE Transactions on Biomedical Engineering, Aug. 23, 2018, 10 pages.
Poh, et al., "Advancements in Noncontact, Multiparameter Physiological Measurements Using a Webcam", IEEE Transactions on Biomedical Engineering, vol. 58, No. 1, Jan. 2011, pp. 7-11, 5 pages.
Poh, et al., "Non-contact, automated cardiac pulse measurements using video imaging and blind source separation", OPT. Express 18, 2010, pp. 10762-10774, 14 pages.
Povsic, Klemen, et al., "Real-Time 3D visualization of the thoraco-abdominal surface during breathing with body movement and deformation extraction", Physiological Measurement, vol. 36, No. 7, May 28, 2015, pp. 1497-1516, 22 pages.
Prochazka, et al., "Microsoft Kinect Visual and Depth Sensors for Breathing and Heart Rate Analysis", Senors, vol. 16, No. 7, Jun. 28, 2016, 11 pages.
Rajan, V., et al., "Clinical Decision Support for Stroke using Multiview Learning based Models for NIHSS Scores", PAKDD 2016 Workshop: Predictive Analytics in Critical Care (PACC), Auckland, New Zealand, 2016, pp. 190-199, 10 pages.
Rajan, V., et al., "Dependency Clustering of Mixed Data with Gaussian Mixture Copulas", 25th International Joint Conference on Artificial Intelligence IJCAI, New York, USA, 2016, pp. 1967-1973, 7 pages.
Reisner, A., et al., "Utility of the Photoplethysmogram in Circulatory Monitoring", American Society of Anesthesiologist, May 2008, pp. 950-958, 9 pages.
Reyes, B.A., et al., "Tidal Volume and Instantaneous Respiration Rate Estimation using a Volumetric Surrogate Signal Acquired via a Smartphone Camera", IEEE Journal of Biomedical and Health Informatics, vol. 21(3), Feb. 25, 2016, pp. 764-777, 15 pages.
Rougier, Caroline, et al., "Robust Video Surveillance for Fall Detection Based on Human Shape Deformation", IEEE Transactions on Circuits and Systems for Video Technology, vol. 21, No. 5, May 2011, pp. 611-622, 12 pages.
Rubinstein, M, "Analysis and Visualization of Temporal Variations in Video", Department of Electrical Engineering and Computer Science, Massachusetts Institute of Technology, Feb. 2014, 118 pages.
Scalise, Lorenzo, et al., "Heart rate measurement in neonatal patients using a webcamera", Department of Industrial Engineering and Mathematical Science, Italy, 978-1-4673-0882-3/12, EEE, 2012, 4 pages.
Schaerer, J., et al., "Multi-dimensional respiratory motion tracking from markerless optical surface imaging based on deformable mesh registration", Physics in Medicine and Biology, vol. 57, No. 2, Dec. 14, 2011, pp. 357-373, 18 pages.
Sengupta, A., et al., "A Statistical Model for Stroke Outcome Prediction and Treatment Planning", 38th Annual International Conference of the IEE Engineering in Medicine and Biology (Society IEEE EMBC2016), Orlando, USA, 2016, pp. 2516-2519, 4 pages.

Shah, Nitin, et al., "Performance of three new-generation pulse oximeters during motion and low perfursion in volunteers", Journal of Clinical Anesthesia, No. 24, 2012, pp. 385-391, 7 pages.
Shao, Dangdang, et al., "Noncontact Monitoring Breathing Pattern, Exhalation Flow Rate and Pulse Transit Time", EEE Transactions on Biomedical Engineering, vol. 61, No. 11, Nov. 2014, pp. 2760-2767, 8 pages.
Shrivastava, H., et al., "Classification with Imbalance: A Similarity-based Method for Predicting Respiratory Failure", IEEE International Conference on Bioinformatics and Biomedicine (IEEE BIBM2015), Washington, DC,USA, 2015, pp. 707-714, 8 pages.
Srinivas, J., et al., "A Mutual Authentication Framework for Wireless Medical Sensor Networks", Journal of Medical Systems, 41:80, 2017, pp. 1-19, 19 pages.
Sun, Yu, et al., "Motion-compensated noncontact imaging photoplethysmography to monitor cardiorespiratory status during exercise", Journal of Biomedical Optics, vol. 16, No. 7, Jul. 1, 2011, 10 pages.
Sun, Yu, et al., "Noncontact imaging photoplethysmography to effectively access pulse rate variability", Journal of Biomedical Optics, vol. 18(6), Jun. 2013, 10 pages.
Tamura, et al., "Wearable Photoplethysmographic Sensors-Past & Present", Electronics, vol. 3, 2014, pp. 282-302, 21 pages.
Tarassenko, L., et al., "Non-contact video-based vital sign monitoring using ambient light and auto-regressive models", Institute of Physics and Engineering in Medicine, vol. 35, 2014, pp. 807-831, 26 pages.
Teichmann, D., et al., "Non-Contact monitoring techniques-Principles and applications", In Proc. of IEEE International Conference of the Engineering in Medicine and Biology Society (EMBC), San Diego, CA, 2012, pp. 1302-1305, 4 pages.
Transue, S., et al., "Real-time Tidal Volume Estimation using Iso-surface Reconstruction", 2016 IEEE First International Conference on Connected Health: Applications, Systems and Engineering Technologies (CHASE), Jun. 27, 2016, pp. 209-218, 10 pages.
Verkruysee, Wim, et al., "Calibration of Contactless Pulse Oximetry", Anesthesia & Analgesia, vol. 124, No. 1, Jan. 2017, pp. 136-145, 10 pages.
Villarroel, Mauricio, et al., "Continuous non-contact vital sign monitoring in neonatal intensive care unit", Healthcare Technology Letters, vol. 1, Issue 3, 2014, pp. 87-91, 5 pages.
Wadhwa, N., et al., "Phase-Based Video Motion Processing", MIT Computer Science and Artificial Intelligence Lab, Jul. 2013, 9 pages.
Wadhwa, N., et al., "Riesz pyramids for fast phase-based video magnification", In Proc. of IEEE International Conference on Computational Photography (ICCP), Santa Clara, CA, 2014, 10 pages.
Wang, W., et al., "Exploiting spatial redundancy of image sensor for motion robust rPPG", IEEE Transactions on Biomedical Engineering, vol. 62, No. 2, 2015, pp. 415-425, 11 pages.
Wu, H.Y., et al., "Eulerian video magnifcation for revealing subtle changes in the world", ACM Transactions on Graphics (TOG), vol. 31, No. 4, 2012, pp. 651-658, 8 pages.
Wulbrand, H., et al., "Submental and diaphragmatic muscle activity during and at resolution of mixed and obstructive apneas and cardiorespiratory arousal in preterm infants", Pediatric Research, No. 38(3), 1995, pp. 298-305, 9 pages.
Yu, M.C., et al., "Noncontact Respiratory Measurement of Volume Change Using Depth Camera", 2012 Annual International Conference of the IEEE Engeineering in Medicine and Biology Society, Aug. 28, 2012, pp. 2371-2374, 4 pages.
Zaunseder, et al., "Spatio-temporal analysis of blood perfusion by imaging photoplethysmography", Progress in Biomedical Optics and Imaging, SPIE—International Society for Optical Engineering, vol. 10501, Feb. 20, 2018, 15 pages.
Zhou, J., et al., "Maximum parsimony analysis of gene copy number changes in tumor phylogenetics", 15th International Workshop on Algorithms in Bioinformatics WABI 2015, Atlanta, USA, 2015, pp. 108-120, 13 pages.

* cited by examiner

NON-CONTACT DEPTH SENSING MONITORING IN VEHICLES

CROSS-REFERENCE TO RELATED APPLICATIONS

The present application claims benefit of priority to U.S. Provisional Patent Application No. 63/291,964 entitled "Non-Contact Depth Sensing Monitoring in Vehicles" and filed on Dec. 21, 2021, which is specifically incorporated by reference herein for all that it discloses or teaches.

FIELD

The present invention relates to a system and method for non-contact monitoring in vehicles, using depth sensing.

BACKGROUND

Video-based monitoring is a new field of patient monitoring that uses a remote video camera to detect physical attributes of the patient. This type of monitoring may also be called "non-contact" monitoring in reference to the remote video sensor, which does not contact the patient.

It is known to use depth sensing devices to determine a number of physiological and contextual parameters for patients including respiration rate, tidal volume, minute volume, effort to breathe, activity, presence in bed. It is also known to provide a visualization of breathing of the patient on a monitor screen.

SUMMARY

In accordance with a first aspect, there is provided a method of non-contact monitoring of an occupant of a vehicle, the method comprising: receiving depth data from at least one depth sensing device that has a field of view of at least part of the interior of the vehicle, wherein the depth data represents depth information as a function of position across the field of view; processing the depth data to obtain further information related to the occupant within the vehicle.

The field of view may comprise at least part of the occupant within the vehicle. The depth information may correspond to or represent the at least part of the occupant in the field of view. The field of view may comprise at least part of a seat of the vehicle. The field of view may comprise at least part of a seating position in the vehicle. The field of view may comprise at least part of an interior of the vehicle such that the occupant or at least part of the occupant is in the field of view when occupying the vehicle.

The at least further information related to the occupant within the vehicle may comprise at least one of: physiological information; contextual information; identity information; position and/or movement information for the occupant and/or an object within the vehicle.

The method may further comprise performing a monitoring process on the occupant and/or an object within the vehicle using the depth data and/or a further signal obtained by processing the depth data.

The method may comprise processing at least the depth data to obtain a physiological signal for the occupant within the vehicle. The physiological signal may be representative of at least one of: respiration rate, pulse rate, tidal volume, minute volume, effort to breathe, oxygen saturation, a breathing parameter.

The depth data may be provided over a monitoring period and wherein the obtained physiological signal comprises a time-varying physiological signal representative of changes in a physiological parameter of the occupant over the monitoring period.

The at least one depth sensing device may comprise at least one of: a depth sensing camera, a stereo camera, a camera cluster, a camera array, a motion sensor.

The at least one depth sensing device may comprise one or more depth sensing elements configured to sense infra-red light thereby to obtain depth information.

The at least one depth sensing device may comprise an image capture device, for example, a camera.

The at least one image-based depth sensing device may comprise an image based or video-based sensing device.

The at least one depth sensing device may comprise an image capture device and an associated depth sensor device.

The at least one image capture device may be configured to obtain a plurality of images of an interior cabin of the vehicle and the depth data may represent depth information for the occupant and/or objects in the interior cabin.

The at least one image-based depth sensing device may be configured to obtain video data comprising a sequence of frames.

The method may comprise processing at least the depth data and/or sampling a signal obtained from processing the depth data in dependence on the movement and/or the position of the vehicle and/or the occupant within the vehicle, such that at least part of the processing and/or the sampling is performed in response to determining that the vehicle and/or the occupant is substantially stationary and/or is substantially moving at a constant speed and/or direction and/or moving at low speed.

The method may comprise determining a movement state of the vehicle using further vehicle sensor data and/or by processing part of the depth data that is changing relative to the vehicle and/or relative to the occupant. The movement state may correspond to one of: substantially stationary and/or moving at a substantially constant speed and/or moving in a substantially constant direction and/or moving at a low speed.

Moving at a low speed may comprise moving at a speed lower than a pre-determined threshold. The pre-determined threshold may be 10 km per hour, optionally 7.5 km per hour, optionally 5 km per hour, optionally 2.5 km per hour.

The further vehicle sensor data may be obtained by a further sensing device comprising a sensor of the vehicle and/or a further device. The further sensing device may comprise a speedometer or an accelerometer or a gyroscopic based device.

The method may comprise receiving a signal representative of the movement state of the vehicle from a further sensing device of the vehicle. The method may comprise receiving movement data from the further sensing device. The method may comprise determining movement data by processing the depth data. The movement data may be representative of one or more movement parameters including: velocity and/or acceleration of the vehicle. The method may comprise processing said movement data to determine the movement state.

The further information may be obtainable by processing the depth data in accordance with one of a plurality of different depth data processing procedures to extract a further signal representative of the further information. The method may further comprise: selecting one of the plurality of depth data processing procedures in dependence on at least one property of the obtained further signal. The at least one property may be representative of one or more of: signal reliability, signal quality, signal noise, signal strength, a signal to noise ratio.

The method may comprise detecting a safety or security event based on at least the depth data and triggering an alarm and/or an alert in response to detecting the safety or security event.

The method may comprise processing at least the depth data or a signal obtained by processing the depth data to detect the safety or security event. Detecting the safety or security event may comprise determining that at least part of the depth data and/or a further signal obtained from the depth data is representative or at least indicative of said safety and/or security event. The safety and/or security event may represent or be at least indicative of at least one of: sleep onset; an unauthorized presence in the vehicle; an unattended passenger, for example, a baby or pet; a reduction in quality of driving; incorrect use or fault in vehicle safety equipment.

The method may further comprise processing at least the depth data to obtain facial signature data for the occupant in the vehicle and using the facial signature data to determine that the occupant is an authorized occupant or unauthorized.

The method may further comprise comparing the determined identity to a pre-determined list of authorized identities. The method may further comprise triggering an alarm in response to determining that the occupant is an unauthorized occupant.

The method may further comprise processing at least the depth data to obtain facial signature data for the occupant in the vehicle and using the facial signature data to attribute physiological data obtained by processing the depth data to the occupant. The occupant may have a profile and the method may further comprise storing the obtained physiological data to the profile.

The method may further comprise processing at least the depth data to monitor for one or more events representative or at least indicative of sleep onset.

The method may further comprise processing at least the depth data to detect an occurrence and/or a frequency of at least one of: yawning and/or an abrupt movement and/or a position of the head and/or other body part of the occupant indicative of sleep onset.

The method may further comprise processing the depth data to monitor relative movement or position of the occupant and/or a further object within the vehicle thereby to detect a reduction in quality of driving based on said relative movement of the occupant and/or the further object within the vehicle.

Detecting the reduction in quality of driving may comprise processing at least the depth data to obtain a quality of driving signal and monitoring the quality of driving signal.

The method may further comprise processing the depth data to monitor safety equipment within the vehicle.

The method may further comprise processing the depth data to monitor a position and/or movement of a seatbelt to determine a fault or incorrect application of the seatbelt.

At least part of the depth data processing may be performed in response to detecting the occurrence of a crash or accident event.

The method may further comprise processing the depth data to monitor deceleration of part of the occupant and/or a part of the vehicle, for example, the seat belt.

The method may further comprise determining movement parameters of the occupant and/or the object. The method may further comprise storing and/or transmitting the determined movement parameters. The movement parameters may comprise a deceleration parameter.

The method may further comprise securing the depth sensing device to a baby or infant seat or pet carrier. The depth sensing camera may have a field of view that include part of the baby or infant seat or pet carrier. In use, the depth sensing device may have a field of view that includes at least part of the baby or infant or pet and processing the depth data as part of a monitoring process. The method may comprise processing depth data associated with the baby or infant or pet.

In accordance with a second aspect, which may be provided independently, there is provided a system for monitoring an occupant in a vehicle, the system comprising at least one depth sensing device having a field of view of at least part of the interior of the vehicle, wherein the at least one depth sensing device is configured to generate depth data representative of depth information as a function of position across the field of view; and a processor configured to process the generated depth data to determine further information related to the occupant within the vehicle.

Features in one aspect may be provided as features in any other aspect as appropriate. For example, features of a method may be provided as features of a system and vice versa. Any feature or features in one aspect may be provided in combination with any suitable feature or features in any other aspect.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted but are for explanation and understanding only.

DETAILED DESCRIPTION

Figure 1:
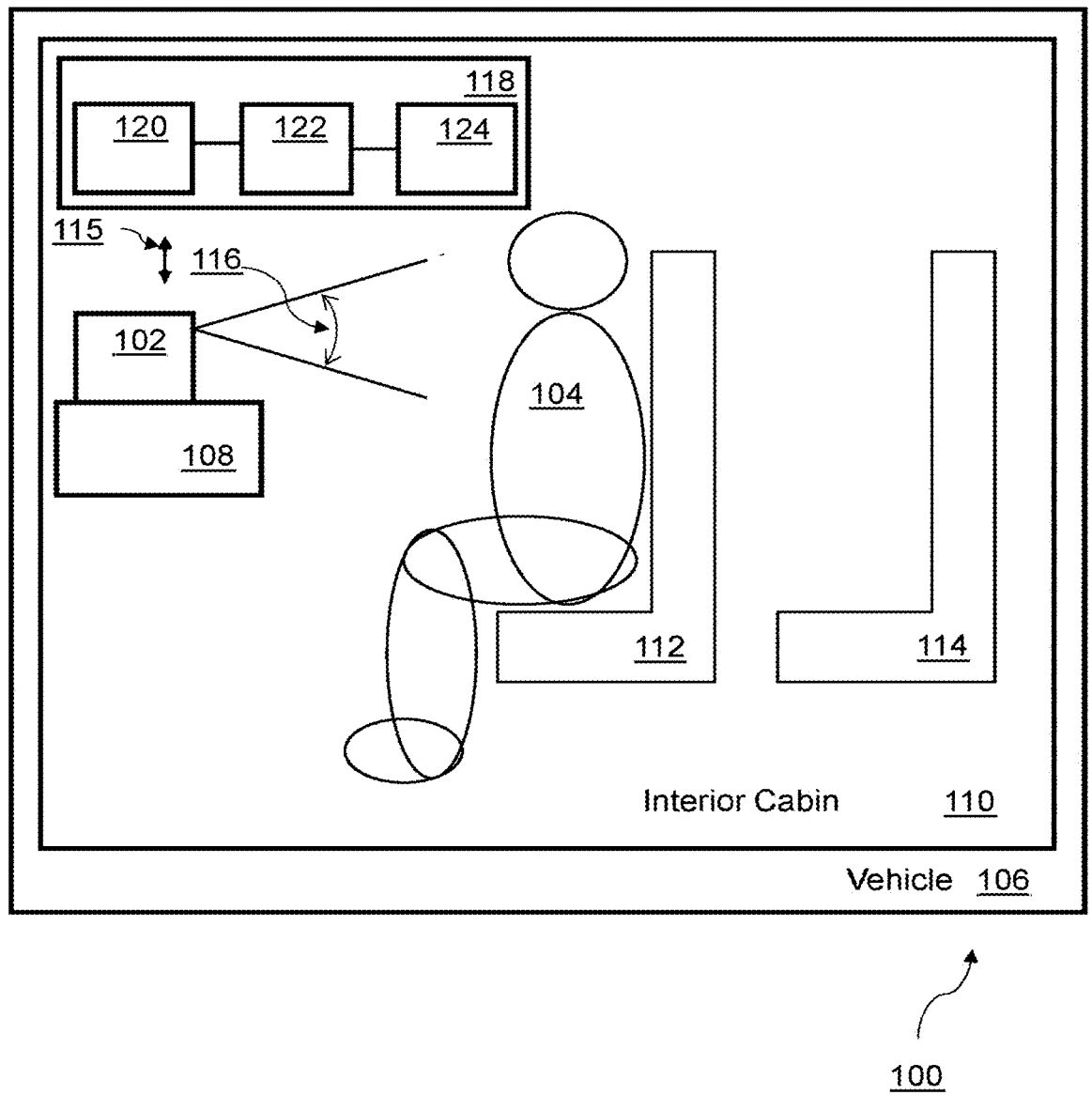
FIG. 1 is a schematic view that illustrates a non-contact occupant monitoring system configured in accordance with various embodiments of the present technology.

FIG. 1 is a schematic view of an occupant monitoring system 100 for monitoring an occupant 104 of a vehicle 106 configured in accordance with various embodiments. The system 100 may be considered as a video-based monitoring system. The system 100 includes a non-contact depth sensing device, in particular, an image-based depth sensing device. In the present embodiment, the image-based depth sensing camera is a depth-sensing camera 102. The camera 102 is placed remote from the occupant 104 of the vehicle 106. It will be understood that, while FIG. 1 depicts a single image capture device (camera 102) the system may have more than one image capture devices.

The camera 102 is remote from the occupant 104, in that it is spaced apart from the occupant 104 and does not contact the occupant 104. The camera 102 is mounted on or otherwise secured to an interior surface of the vehicle 106. In the present embodiment, the camera 102 is mounted on a surface of the dashboard 108. The camera 102 has a field of view 110 that includes the interior of the vehicle 106, in this embodiment, the field of view 110 includes at least part of the interior cabin 110, including part of the driver seat 112. In the present embodiment, the vehicle 106 is a car, and the occupant 104 is the driver of the car 106. In use, the occupant 104 is seated on the driver's seat 112. One or more passenger seats 114 are also provided inside the car. In some embodiments, the field of view includes at least part of a seat or seating position for an occupant of the vehicle.

In the embodiment of FIG. 1, the field of view 116 includes an upper part of the driver's seat 112 such that, in use, a chest region of the occupant 104 is visible in the field of view 116, to allow respiratory information to be obtained using depth sensing. It will be understood that, for other physiological signals or for obtaining other information related to the occupant 104, the camera 102 may be provided at a different viewpoint in the vehicle or having a different viewing angle so that the field of view includes a different region the occupant 104.

The camera 102 generates a sequence of images over time. In the described embodiments, the camera 102 is a depth sensing camera, such as a Kinect camera from Microsoft Corp. (Redmond, Wash.) or a RealSense depth camera from Intel (Intel, Santa Clara, California). A depth sensing camera can detect a distance between the camera and objects in its field of view. This depth information can be used, as disclosed herein, to determine that an occupant is within the field of view of the camera 102 and determine a region of interest (ROI) to monitor on the occupant. Once an ROI is identified that ROI can be monitored over time, and depth data associated with the region of interest obtained. The depth information is obtained as a function of position across the field of view.

In the embodiments described herein, the depth data is processed to extract further information related to the occupant. A number of examples are described herein. The further information obtaining by the method and system includes, for example, one or more of: physiological information, contextual information or identity information. Physiological information may include, for example, information related to respiration, breathing or heart rate, for example, respiration rate, pulse rate, tidal volume, minute volume, effort to breathe, oxygen saturation or any breathing parameter or vital sign. Physiological information may include any parameter or signal associated with the functioning of the body. Contextual information include, for example, presence information or activity information. Identity information may include any information that identifies the occupant of the vehicle, for example, facial signature information. The information obtained may also include, for example, position information for the occupant within the vehicle or movement information for the occupant within the vehicle. In some embodiments, the obtained further information relates to an object associated or interacting with the occupant. For example, an object that contacts the occupant, such as a seatbelt, may be monitored using non-contact depth sensing in accordance with embodiments. The further information may be extracted from depth data from the depth sensing device by applying known depth data processing algorithms.

In some embodiments, physiological information about the occupant is extracted from the depth information in accordance with known depth data processing techniques. A review of known depth data processing techniques is provided in "*Noncontact Respiratory Monitoring Using Depth Sensing Cameras: A Review of Current Literature*", Addison, A. P., Addison, P. S., Smit, P., Jacquel, D., & Borg, U. R. (2021). Sensors, 21(4), 1135. As a non-limiting example, changes in depth of points within the ROI (in particular, a chest region of the occupant) can represent movements of the occupant that are associated with breathing. The region of interest is first identified using known region identifying techniques. Accordingly, those movements, or changes of points within the ROI, can be used to determine a respiratory signal or other signal associated with breathing. In this embodiment, the depth data includes data representative of a change of depth of the subject and/or a further object inside the vehicle. In this embodiment, respiratory monitoring is performed using the depth data. In some embodiments, the depth data corresponding to only part of the image, for example, one or more regions of interest is processed. In some embodiments, the depth data for the whole image is processed.

The image-based depth sensing device may have depth sensor elements that sense light having infra-red wavelengths. The depth sensor elements may sense electromagnetic radiation having wavelengths in the range 1 mm to 700 nm. By using infra-red wavelength depth sensing, the system may offer advantages in low light conditions, for example, during night driving. While an infra-red wavelength depth sensing camera is described, it will be understood that other wavelengths of light or electromagnetic radiation may be used.

In the described embodiments, a region of interest is described and it will be understood that the method may further include the step of positioning the depth sensing device such that the field of view includes a region of interest of the occupant. The sensing device may be mounted or secured to a part of the interior of the vehicle. The image-based depth sensing device may be mounted and/or secured to, for example, part of the vehicle cabin, the dashboard, an inner surface or border of the windscreen, part of a seat, the ceiling.

Figure 2:
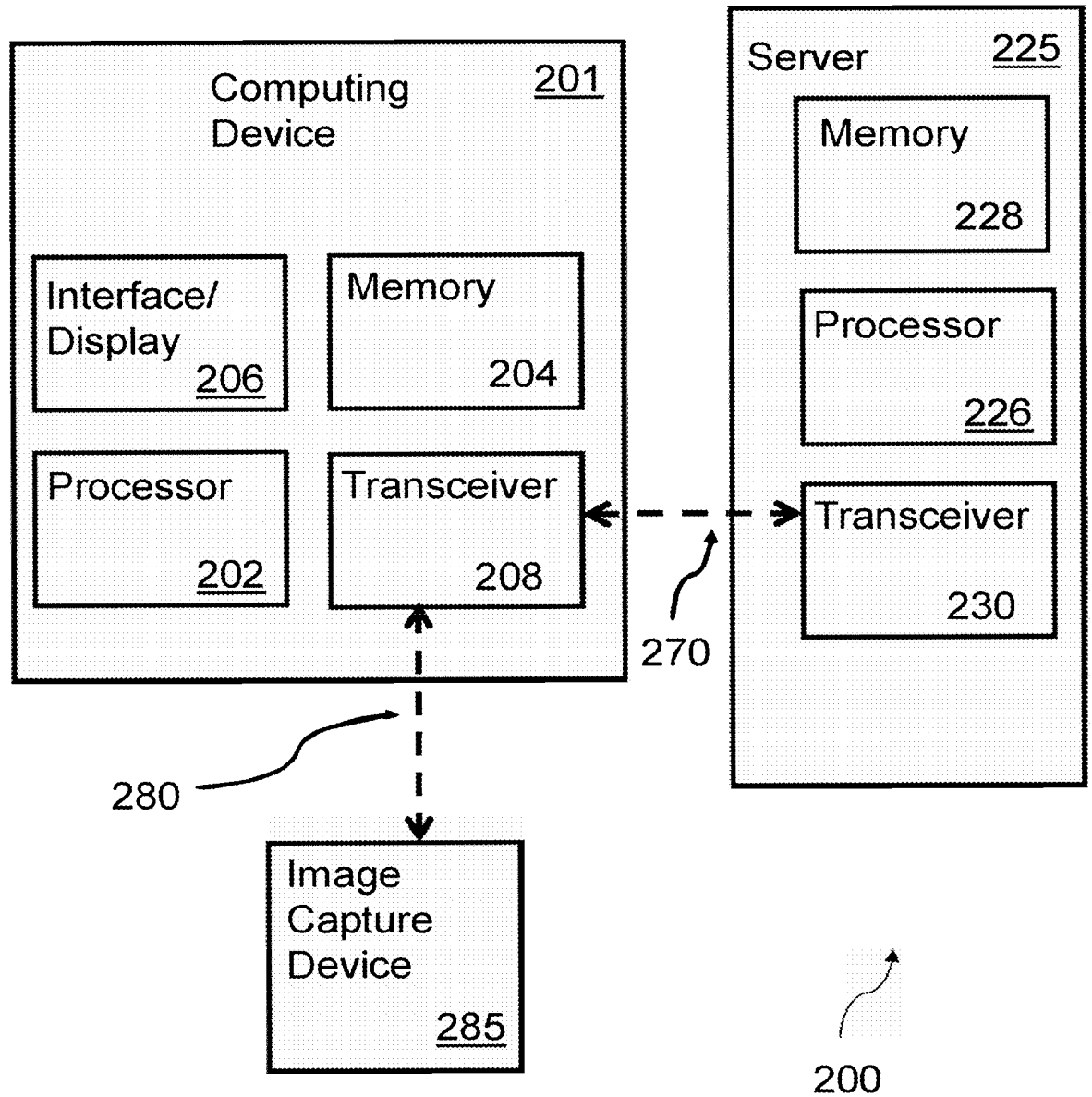
FIG. 2 is a block diagram that illustrates a non-contact occupant monitoring system having a computing device, a server, and one or more image capture devices, and configured in accordance with various embodiments.

While only a single camera is depicted in FIG. 1 and FIG. 2, it will be understood that, in some embodiments, multiple cameras may be mounted or positioned about the interior of the vehicle. Such camera may be, for example, integrated into the vehicle superstructure. Depth data obtained from these multiple viewpoints may be combined to obtain further information about the occupant. In the present embodiment, the camera is fixed and therefore has a fixed field of view. The field of view of the camera may be defined by a first subtended angle and a second subtended angle. The first and second subtended angles may be in the range, for example, 10 to 100 degrees. In further embodiments, the first and second subtended angles may be in the range 40 to 95 degrees.

While the camera 102 may be a depth sensing camera, in accordance with various embodiments, any image-based or video-based depth sensing device may be used. For example, a suitable depth sensing device may be a depth sensor that provides depth data for object in the field of view. In some embodiments, the system has an image capture device for capturing images of the interior of the vehicle (for example, across the field of view) together with an associated depth sensor that provides depth data associated with the capture images. The depth information is obtained as a function of position across the field of view of the depth sensing device.

In some embodiments, the depth data can be represented as a depth map or a depth image that includes depth information of surfaces of scene objects from a viewpoint (for example, the position of the image capture device). The depth data may be part of a depth data channel that corresponds to a video feed. The depth data may be provided together with image data that comprises RGB data, such that each pixel of the image has a corresponding value for RGB and depth. The depth data may be representative or indicative of a distance from a viewpoint to a surface in the vehicle. This type of image or map can be obtained by a stereo camera, a camera cluster, camera array, or a motion sensor. When multiple depth images are taken over time in a video stream, the video information includes the movement of the points within the image, as they move toward and away from the camera over time.

The captured images, in particular, the image data corresponding to the captured images and the corresponding depth data are sent to a computing device 118 through a wired or wireless connection 115. The computing device 118 includes a processor 120, a display 122, and hardware memory 124 for storing software and computer instructions. Sequential image frames of the occupant are recorded by the camera 102 and sent to the processor 120 for analysis. The display 122 may be remote from the camera 102, such as a video screen positioned separately from the processor and memory.

Other embodiments of the computing device may have different, fewer, or additional components than shown in FIG. 1. In some embodiments, the computing device may be a server. In other embodiments, the computing device of FIG. 1 may be additionally connected to a server (e.g., as shown in FIG. 2 and discussed below). The depth data associated with the images/video can be processed or analysed at the computing device and/or a server to obtain physiological information and/or further contextual information for the occupant 104 within the vehicle 106.

FIG. 2 is a block diagram illustrating a vehicle occupant monitoring system 200, having a computing device 201, a server 225, and an image capture device 285 according to embodiments. In various embodiments, fewer, additional and/or different components may be used in a system.

The computing device 201 includes a processor 202 that is coupled to a memory 204. The processor 202 can store and recall data and applications in the memory 204, including applications that process information and send commands/signals according to any of the methods disclosed herein. The processor 202 may also display objects, applications, data, etc. on an interface/display 206. The processor 202 may also receive inputs through the interface/display 206. The processor 202 is also coupled to a transceiver 208. With this configuration, the processor 202, and subsequently the computing device 201, can communicate with other devices, such as the server 225 through a connection 270 and the image capture device 285 through a connection 280. For example, the computing device 201 may send to the server 225 information determined about an occupant from images captured by the image capture device 285 (such as a camera), such as depth information of an occupant in an image or visual indicators representing the further information determined about the occupant by depth data processing.

The computing device 201 may correspond to the computing device of FIG. 1 (computing device 118) and the image capture device 285 may correspond to the image capture device of FIG. 1 (camera 102). Accordingly, the computing device 201 may be located remotely from the image capture device 285, or it may be local and close to the image capture device 285.

In various embodiments disclosed herein, the processor 202 of the computing device 201 may perform the steps described herein. In other embodiments, the steps may be performed on a processor 226 of the server 225. In some embodiments, the various steps and methods disclosed herein may be performed by both of the processors 202 and 226. In some embodiments, certain steps may be performed by the processor 202 while others are performed by the processor 226. In some embodiments, information determined by the processor 202 may be sent to the server 225 for storage and/or further processing.

In some embodiments, the image capture device 285 is or forms part of a remote depth sensing device. The image capture device 285 can be described as local because it is relatively close in proximity to an occupant so that at least a part of the occupant is within the field of view of the image capture device 285. In some embodiments, the image capture device 285 can be adjustable to ensure that the occupant is captured in the field of view. For example, the image capture device 285 may be physically movable, may have a changeable orientation (such as by rotating or panning), and/or may be capable of changing a focus, zoom, or other characteristic to allow the image capture device 285 to adequately capture the occupant for monitoring. In various embodiments, a region of interest may be adjusted after determining the region of interest. For example, after the ROI is determined, a camera may focus on the ROI, zoom in on the ROI, centre the ROI within a field of view by moving the camera, or otherwise may be adjusted to allow for better and/or more accurate tracking/measurement of the movement of a determined ROI.

The server 225 includes a processor 226 that is coupled to a memory 228. The processor 226 can store and recall data and applications in the memory 228. The processor 226 is also coupled to a transceiver 230. With this configuration, the processor 226, and subsequently the server 225, can communicate with other devices, such as the computing device 201 through the connection 270.

The devices shown in the illustrative embodiment may be utilized in various ways. For example, any of the connections 270 and 280 may be varied. Any of the connections 270 and 280 may be a hard-wired connection. A hard-wired connection may involve connecting the devices through a USB (universal serial bus) port, serial port, parallel port, or other type of wired connection that can facilitate the transfer of data and information between a processor of a device and a second processor of a second device. In another embodiment, any of the connections 270 and 280 may be a dock where one device may plug into another device. In other embodiments, any of the connections 270 and 280 may be a wireless connection. These connections may take the form of any sort of wireless connection, including, but not limited to, Bluetooth connectivity, Wi-Fi connectivity, infrared, visible light, radio frequency (RF) signals, or other wireless protocols/methods. For example, other possible modes of wireless communication may include near-field communications, such as passive radio-frequency identification (RFID) and active RFID technologies. RFID and similar near-field communications may allow the various devices to communicate in short range when they are placed proximate to one another. In yet another embodiment, the various devices may connect through an internet (or other network) connection. That is, any of the connections 270 and 280 may represent several different computing devices and network components that allow the various devices to communicate through the internet, either through a hard-wired or wireless connection. Any of the connections 270 and 280 may also be a combination of several modes of connection.

It will be understood that the configuration of the devices in FIG. 2 is merely one physical system on which the disclosed embodiments may be executed. Other configurations of the devices shown may exist to practice the disclosed embodiments. Further, configurations of additional or fewer devices than the ones shown in FIG. 2 may exist to practice the disclosed embodiments. Additionally, the devices shown in FIG. 2 may be combined to allow for fewer devices than shown or separated such that more than the three devices exist in a system. It will be appreciated that many various combinations of computing devices may execute the methods and systems disclosed herein. Examples of such computing devices may include other types of devices and sensors, infrared cameras/detectors, night vision cameras/detectors, other types of cameras, radio frequency transmitters/receivers, smart phones, personal computers, servers, laptop computers, tablets, blackberries, RFID enabled devices, or any combinations of such devices.

Figure 3:
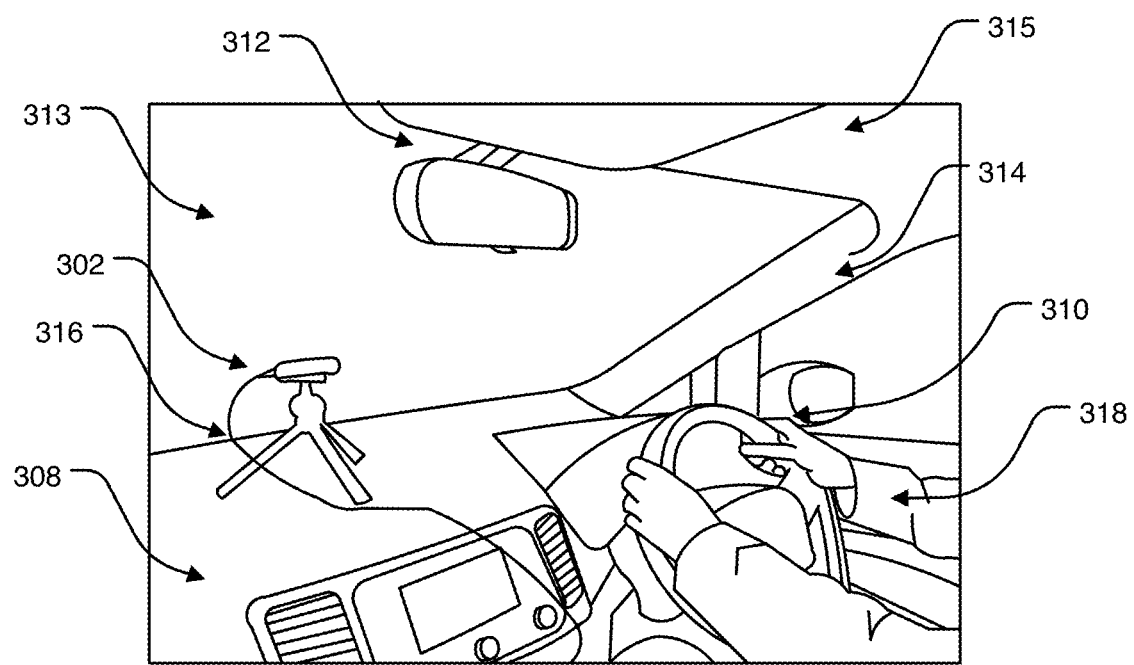
FIG. 3 depicts a non-contact occupant monitoring system including image capture device inside the vehicle, in accordance with various embodiments.

FIG. 3 depicts a set-up of a vehicle occupant monitoring system, in accordance with various embodiments. The occupant monitoring system of FIG. 3 has a camera 302 that corresponds to the camera 102 or image capture device 285 described with reference to FIG. 1 and FIG. 2 respectively. It will be understood that, for clarity, the other components of the vehicle occupant monitoring system (for example, the computing device and/or the server) are not shown in FIG. 3.

FIG. 3 shows camera 302 in the interior cabin of the vehicle, in accordance with various embodiments. As described with reference to FIG. 1, the camera 302 is a depth sensing camera. Camera 302 is connected by connection 316, to a computing device (not shown). While FIG. 3 shows camera 302 mounted on a surface of the dashboard 308 using a tripod it will be understood that, in other embodiments, other mounting mechanisms may be used to mount the camera 302 to the dashboard 308 or other part of the interior cabin. Likewise, in other embodiments, the camera may be mounted or secured to a different surface of the interior cabin, for example, the steering wheel 310, part of the rear-view mirror 312, part of the front window frame 314 or front window 313 and/or the cabin ceiling 315. FIG. 3 also depicts part of the occupant 318, in this case, the occupant 318 is the driver of the vehicle.

Figure 4:
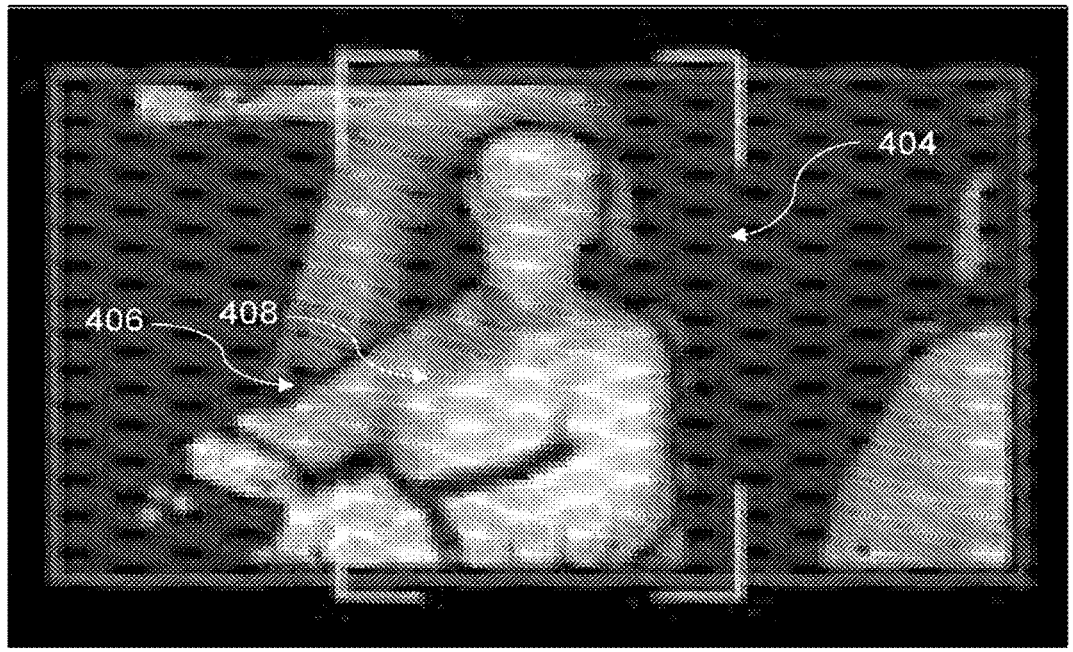
FIG. 4 is an image captured by a camera according to various embodiments described herein.

FIG. 4 depicts an image 402 captured by a camera according to various embodiments described herein. In particular, image 402 can be considered as an image captured by camera 302 described with reference to FIG. 3. The image 402 is a depth image (also referred to as a depth map) captured by the depth sensing camera 302. The depth image includes depth information about the distance from the camera to the objects in the image across the field of view. This type of image or map can be obtained by a stereo camera, a camera cluster, camera array, or a motion sensor. When multiple depth images are taken over time in a video stream, the video information includes the movement of the points within the image, as they move toward and away from the camera over time. The depth data represents depth information across the field of view of the camera, in particular, the depth information is a function of position across the field of view.

The image 402 includes a representation of an occupant 406 (corresponding to occupant 318 of FIG. 3) and a region of interest (ROI) 404. In this embodiment, the ROI 404 includes the chest region of the occupant. The ROI 404 provides depth data that can allows a respiratory signal to be determined. The ROI 404 is located about the occupant's chest. In this example, the ROI 404 is a rectangular box. In various embodiments, other ROIs may be different shapes. Because the image includes depth data, such as from a depth sensing camera, information on the spatial location of the occupant 406, and therefore the occupant's chest and the ROI 404, can also be determined.

The depth information can be contained within a matrix, for example, or any suitable mathematical representation. As the occupant 406 breathes, the occupant's chest moves toward and away from the camera, changing the depth information associated with the images over time. As a result, the location information associated with the ROI 404 changes over time. The position of individual points within the ROI 404 may be integrated across the area of the ROI 404 to provide a change in volume over time.

Figure 5:
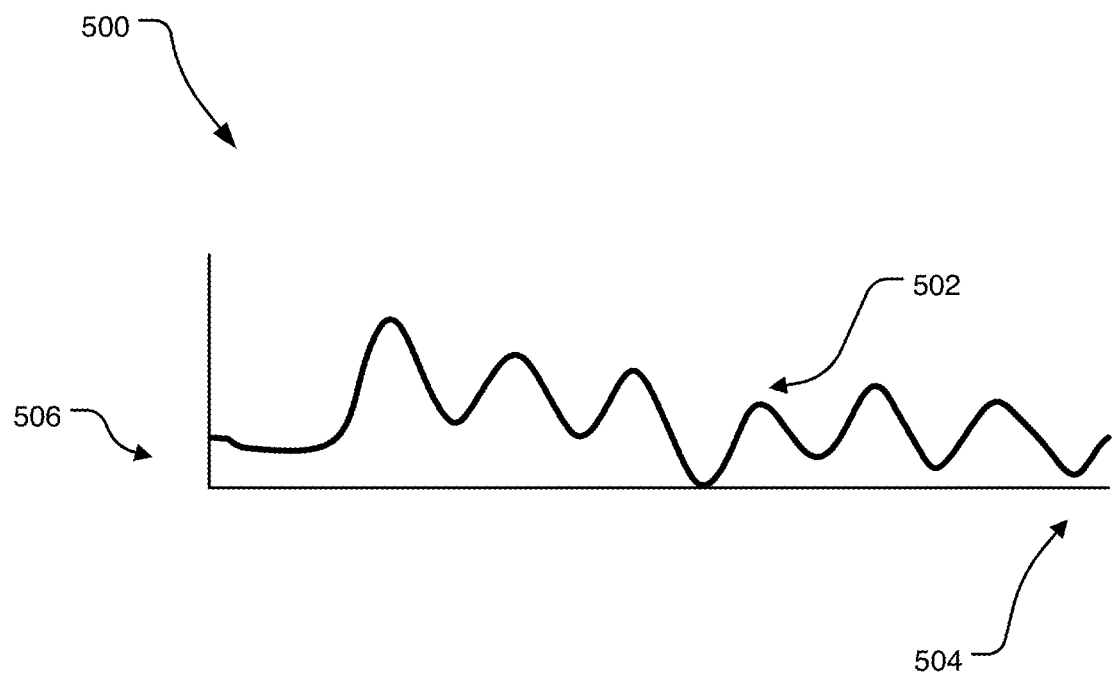
FIG. 5 is a graph showing a respiratory waveform over time, according to various embodiment described herein.

FIG. 5 is a graph 500 showing a respiratory waveform 502 determined using the depth information of the depth image, according to various embodiments described herein. FIG. 5 depicts a graph of volume displacement. The x-axis 504 of graph 500 is time. The y-axis 506 of graph 500 is volume displacement (the sum of depth changes over time).

Figure 6:
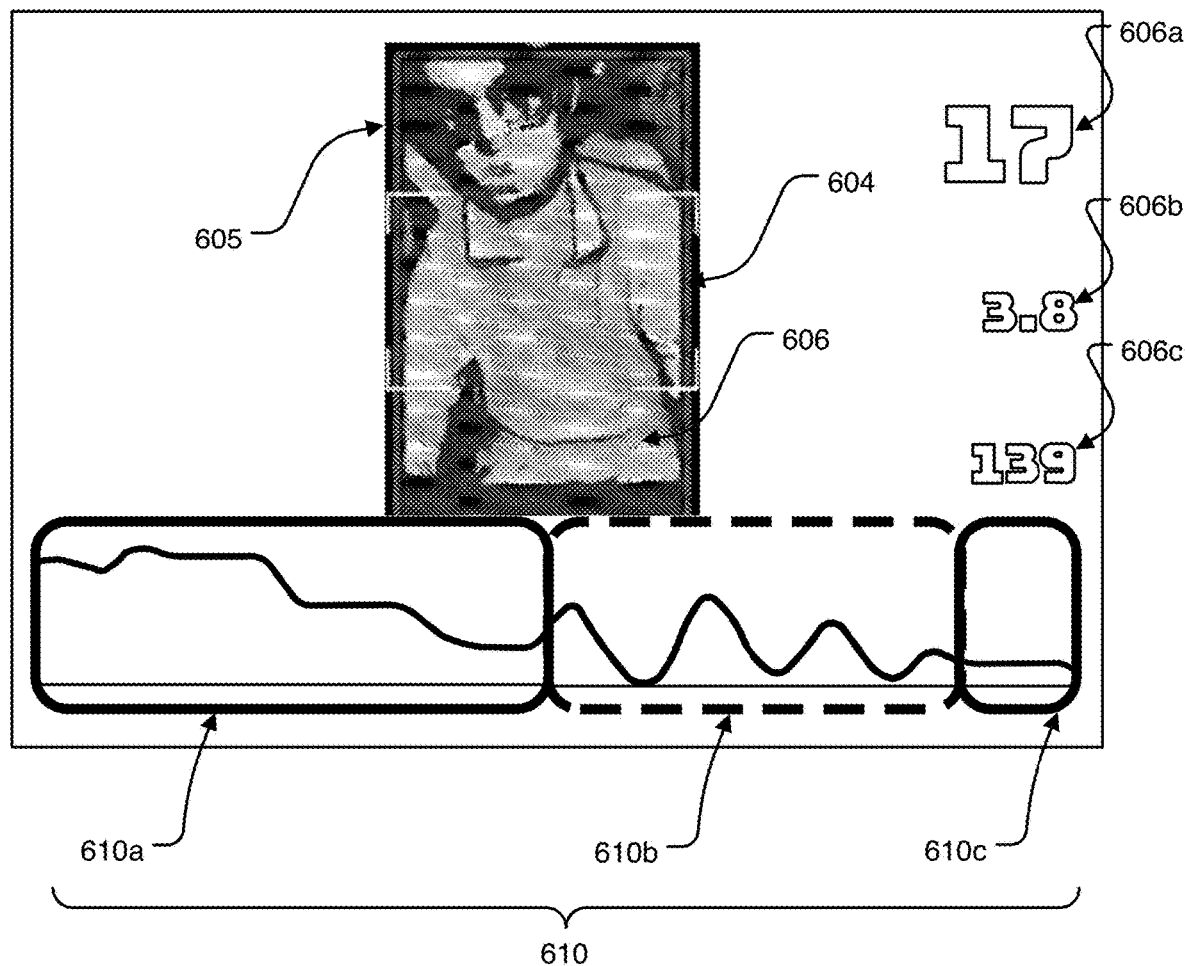
FIG. 6 is a screenshot of a display of the system, in accordance with embodiments, depicting an image captured by a camera, an obtained physiological signal and corresponding physiological parameters.

FIG. 6 shows a screenshot displayed by a display of the system, in accordance with embodiments. The screenshot is captured by the system described with reference to FIG. 3. The screenshot includes a captured image (a depth image) 602 of an occupant 606 of a vehicle, in accordance with embodiments. It will be understood that the depth image depicted is one of a sequence of depth images captured over time as part of a video stream from the camera. Also depicted in image 602 is a region of interest 604. FIG. 6 also depicts current values of three determined physiological parameters: respiration rate 606a; indicative minute volume 606b, and indicative tidal volume 606c.

FIG. 6 also depicts a graph showing a respiratory signal, in this embodiment, a volume waveform 610, of the occupant when operating during driving. The volume waveform represents the volume of air being inhaled and exhaled from the driver's chest. The volume waveform can be used to extract parameters such as tidal volume, minute volume and respiration rate. The respiratory signal is a physiological signal obtained by processing depth data, as described with reference to FIGS. 1 and 2. FIG. 6 shows how one or more aspects of the signal, including the quality and reliability of the signal, may be influenced by external noise, for example, arising from external movement that is not movement of the region of interest movement. The external movement may be due to movement of the occupant within the vehicle or due to movement of the vehicle itself, for example, due to forces arising from an acceleration or deceleration or change in direction of the vehicle.

The respiratory signal of FIG. 6 is depicted in three portions over three respective periods of time: a first signal portion 610a over a first period that experiences substantial external noise due to motion; a second signal portion 610b over a second period in which the respiratory signal experiences less noise and the respiration signal is clear; and a third signal portion 610c in which the respiratory signal experiences substantial external noise due to motion. Second signal portion 610b clearly corresponds to a reliable signal corresponding to breath of the occupant, while the signal of the first and third portions have lesser quality.

As signal reliability and quality varies over a journey time, in some embodiments, the system is configured such that the monitoring process of the respiratory signal (or the any further information obtained from processing the depth data) is performed only during part of a vehicle journey. For example, in some embodiments, the monitoring is performed when the movement of the vehicle corresponds to a movement state in which a reliable signal is likely to be determined. For example, when the vehicle is stationary or moving at a constant speed or not changing direction. In further embodiments, the monitoring may be performed when it is determined is moving in a constant direction or has an acceleration or deceleration lower than a desired threshold value.

In further detail, in various embodiments, the processor of the computing device obtains movement information and determines a movement state of the vehicle and determine whether the movement state is one of the movement states that provides a reliable signal. As a non-limiting example, the movement states that provide reliable signals can be considered as one of: stationary, constant direction (i.e., the vehicle is not turning), and constant speed. In other embodiments, the reliable signal movement states may be defined in change of speed or direction such that the change in speed or direction is below a pre-determined threshold value.

The movement information may be obtained by processing depth data obtained by the camera or from further sensors associated with or in the vehicle. In an example embodiment, the processor obtains a further sensor signal representing movement data, in this example, the speed of the vehicle, from the speedometer of the vehicle. The processor processes the movement data to determine the movement state of the car. In this example, the signal is continuously monitored to determine the movement state. If the determined movement state is one of the pre-determined reliable movement states (in this case, stationary) the processor proceeds to process the depth data to obtain the physiological signal. It will be understood that other vehicle movement data relating to velocity, speed, acceleration, or direction of travel may be used.

In this example embodiment, the movement data is obtained from a further movement sensor (in this example, the movement data is speed data, and the further sensor is the speedometer of the vehicle). It will be understood that, while a speedometer is described, in further embodiment, the further movement sensor may be a different vehicle sensor or a sensor of a further device, for example, a sensor of a connected smartphone or smart device.

In a further embodiment, the movement state may be determined by using depth processing on the obtained depth data (either independently or together with further sensor data). As a non-limiting example, the movement state may be determined by performing suitable processing on depth data from a region of the depth image that depicts movement of the vehicle. For example, a background region of the depth image or a part of the depth image corresponding to a window may be analysed to obtain movement data or the movement state.

In a further embodiment, movement of the occupant inside the vehicle may be detected using, for example, depth data processing or from a further sensor, for example, a wearable or portable device that includes a sensor, such as an accelerometer. Therefore, part of the monitoring process may be performed in response to determining that the occupant is moving relative to the vehicle. Such relative movement of the occupant may lead to a noisier and less reliable signal.

It will be understood that the process of determining the movement state of the vehicle or relative movement of the occupant from the movement data may be performed using a number of different suitable processes. The processes include threshold-based processes (for example, comparing movement parameters to suitable thresholds). In further embodiments, the movement state is determined by a computing device of the vehicle itself and a signal representative of the movement state is received by the processor.

Figure 7:
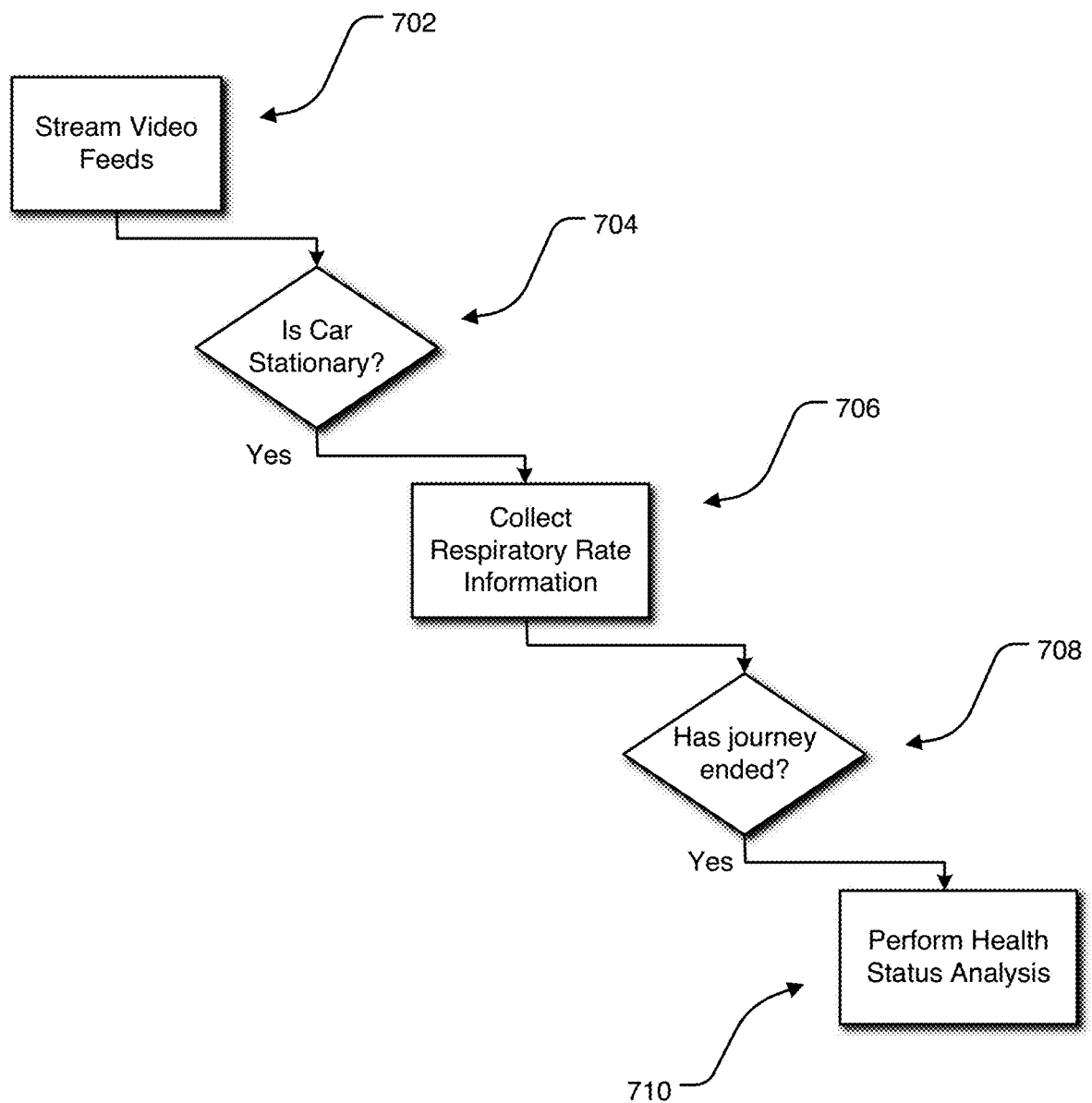
FIG. 7 is a flow-chart showing a method of monitoring an occupant in a vehicle, in accordance with various embodiments.

FIG. 7 is a flow-chart of a method of monitoring an occupant of a vehicle in accordance with embodiments. The method is described as performed by the system described with reference to FIG. 3, however, it will be understood that other system configurations may be used. In this method the determined movement states may be one of: stationary and not stationary, however, it will be understood that other movement states may be determined in further embodiments (for example, physiological information is obtained when movement state is stationary or moving at a constant speed and direction and not obtained when the movement state corresponds to acceleration or deceleration).

At step 702, images are captured by the depth sensing camera 302 in the vehicle in the form of streamed video feeds. These video feeds contain depth data.

At step 704, a determination of the movement state of the vehicle, in this embodiment, a car, is performed by the processor. In further detail, in this embodiment, a determination of whether the car is stationary is performed. In the embodiment of FIG. 7, movement data is obtained from the speedometer of the vehicle and processed to determine that the car is stationary. The car being stationary may correspond to the vehicle being stopped at a traffic light or stopped in traffic.

At step 706, in response to determining that the car is stationary, physiological information is collected. In the embodiment of FIG. 7, depth data is processed to obtain respiratory rate information only when the car is stationary. In this embodiment, the depth data is processed to obtain respiration rate, however, it will be understood that, in other embodiments, other physiological signals and/or physiological parameters may be determined and monitored when the car is stationary.

While the method of FIG. 7 describes collecting physiological information when the vehicle is stationary, in some embodiments, the movement state may correspond to the car travelling at low speed, for example, a speed corresponding to a vehicle crawling in traffic. As a non-limiting example, the threshold may be any speeds below 10 kilometres per hour. In such embodiments, when the speed of the car is below such a pre-set threshold, physiological information may be reliable collected.

Following step 706, when the vehicle begins to move again from its stationary state, the processor determine that the movement state of the vehicle is not stationary. In response to determining that the movement state is not stationary, processing of the depth data is stopped and physiological information is not collected.

At step 708, a further movement state of the vehicle is determined. In the embodiment of FIG. 7, this step corresponds to determining that the journey has ended. This may be indicated by, for example, received movement data being indicative of an extended stationary period or, for example, a further signal received from the vehicle indicative that the journey has ended. Such signals may be from the engine or a further vehicle control system. Such a signal may be from a further sensor that is configured to detect that the driver or occupant has left the vehicle.

At step 710, in response to determining that the journey has ended, further processing using the collected physiological information is performed. In the embodiment of FIG. 7, a health status analysis is performed. In this embodiment, the health status analysis takes into account the physiological information obtained at each stationary point of the journey. The embodiments described may allow for sampling of physiological information when conditions are optimum and, for example, when a resting respiratory rate may be obtained.

In the embodiment of FIG. 7, the monitoring of physiological information is performed by performing the processing of depth data only when the vehicle is stationary. In an alternative embodiment, the depth data may be analysed continuously to obtain a physiological signal, throughout the journey, and a measure of signal quality (for example, signal to noise ratio) may be determined. In such an embodiment, when the signal to noise ratio is sufficiently high (for example, higher than a pre-determined threshold value) the physiological signal is sampled to obtain physiological information.

In the above-described embodiments, the extraction of a physiological signal or other information from the depth data can be performed in accordance with a number of different processing procedures or depth processing algorithms. Examples of depth processing algorithms can be found in "Noncontact Respiratory Monitoring Using Depth Sensing Cameras: A Review of Current Literature", *Sensors*, 21(4), 1135 by Addison, A. P., Addison, P. S., Smit, P., Jacquel, D., & Borg, U. R. (2021). In further embodiments, the system is configured to select from one of a number of different depth processing algorithms to process the depth data. The selection of a suitable algorithm is made depending on, for example, a measure of signal quality or a determined movement state of the vehicle.

In a first example, a measure of signal quality (for example, a signal to noise ratio) is calculated from a physiological signal that has been determined using a first depth processing algorithm. If the measure of signal quality is indicative that the signal is of low quality or is unreliable (for example, the signal to noise is below a pre-determined threshold value) then the method proceeds to select a different depth processing algorithm.

The selection of depth processing algorithm can be made based on a determination of which depth processing algorithm may provide the most reliable signal. In a further example, a measure of expected signal quality may be determined for two or more of the processing algorithms and compared, and the depth processing algorithm that provides the highest signal quality or at least meets a signal quality threshold is automatically selected for processing the depth data. The measure of expected signal quality may be determined using depth data and/or other sensor data (for example, vehicle sensor data). As a first non-limiting example, an expected fill ratio of the depth map may be used. A depth map may contain invalid points corresponding to points or pixels of the image that do not have a constructed depth value. The fill ratio is a measure of the number of valid points divided by the total number of points. As a further non-limiting example, the measure of expected signal quality may be determined based on a determined movement state of the vehicle. In such embodiments, the measure of expected signal quality may indicate that determined physiological signal is likely to be noisy, and therefore a different algorithm may be used that offers improvement in signal quality. In such embodiments, the measure of expected signal quality may indicate that the determined physiological signal is likely to be reliable and be of high quality.

While these embodiments relate to determining physiological information, it will be understood that other information about the occupant may be extracted from the depth data in the form of a further signal. The selection of algorithm used to extract the further signal may be based on expected signal quality or other properties of the extracted signal. Properties that may be used, include suitable measures of signal reliability, signal quality, signal noise, signal strength or a signal to noise ration.

In further embodiments, the monitoring system monitors the captured depth data or information derived from the depth data to detect safety or security events associated with the vehicle or the occupant. In such embodiments, the system triggers an alarm or alert after detecting the safety or the security event. The safety or security events may correspond to a number of non-limiting examples, which are described in the following.

In a first example, a security event corresponding to an unauthorized or unexpected presence within the vehicle may be detected. In this embodiment, depth data from a region associated with the face of the occupant is processed as part of a facial recognition process to determine and log the identity of the occupant. In this embodiment, facial signature data is obtained by processing the depth data. A comparison process is then performed between the obtained facial signature data and facial signature data in a pre-determined list of authorized occupants to determine that the identity corresponds to an authorized occupant. In the event that the identity does not correspond to an authorized occupant, the alarm or alert is triggered.

In a second example, the safety event corresponds to an event representative of sleep onset for the occupant, also referred to as sleep onset events. In such an embodiment, the depth data is processed to identify the occurrence of such events. For example, the depth data is processed to detect the occurrence of a yawn or the frequency of yawning. Abrupt movements of a body part, for example, a head, may also be detected, in some embodiments, and be indicative of sleep onset. A position of a body part may also be indicative of sleep onset (for example, a position or lowering of the head). The alarm or alert may be triggered in response to the detection of a single event or a trend of events in a time period.

Figure 8:
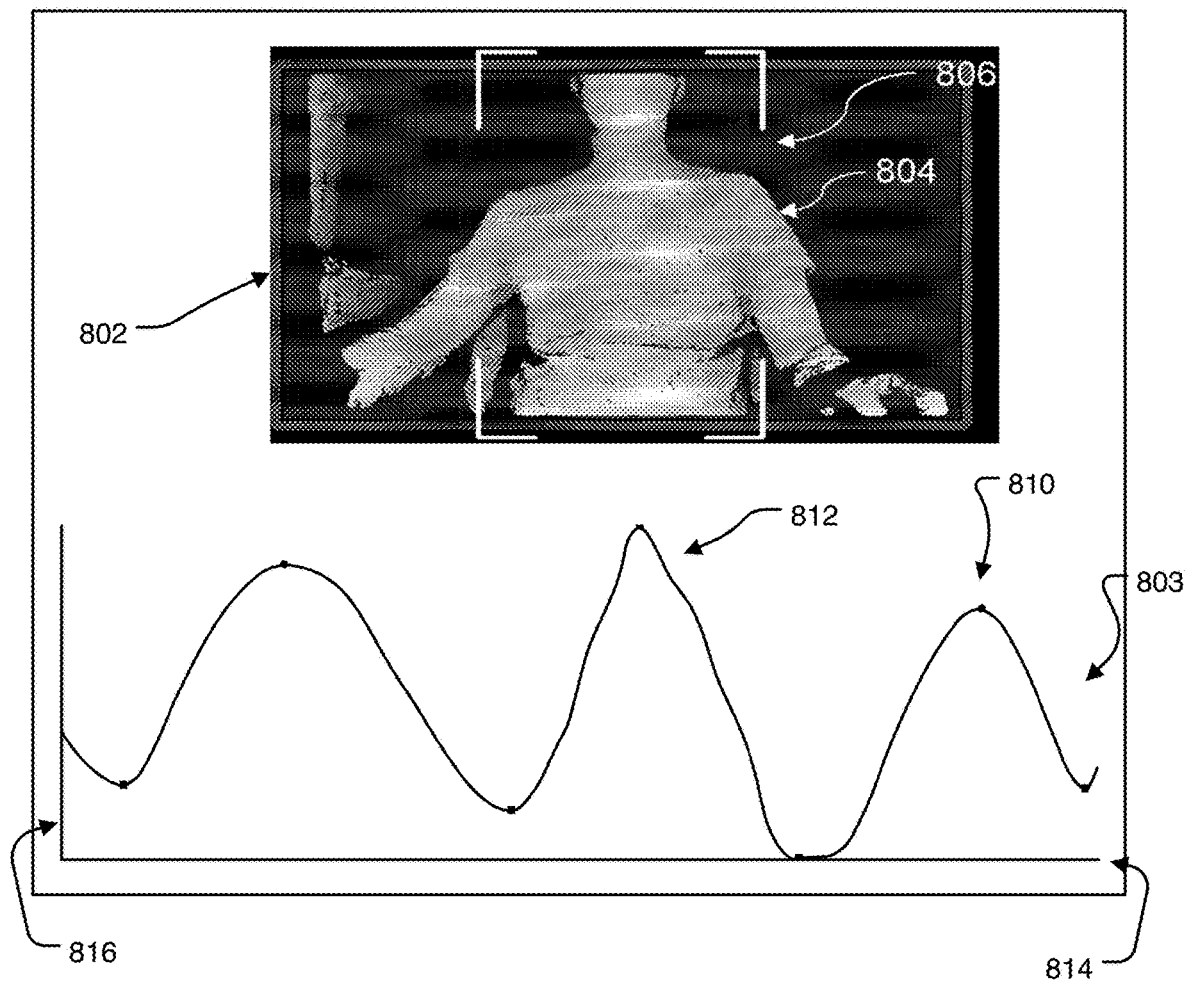
FIG. 8 is a further screenshot of a display of the system, in accordance with various embodiments, depicting an image captured by a camera and an obtained physiological signal.

FIG. 8 is a screenshot having a depth image 802 and a graph 803 that depicts an obtained physiological signal 810 from processing the depth data. The depth image 802 show a region of interest 804 of the depth image and an occupant of the vehicle, in this example, a driver 806.

The obtained physiological signal 810 is a respiratory signal, in this example, a volume waveform. The volume waveform is representative of the volume of air being inhaled and exhaled from the driver's chest. The volume waveform can be used to extract physiological parameters such as: tidal volume, minute volume and respiration rate. A sleep onset feature 812 is present in the physiological signal extracted from the depth data of the chest of the occupant and represents additional oxygen intake by the occupant corresponding to a yawn. On detection of the sleep onset feature 812 in the physiological signal or the sleep event in the depth data, an alert is triggered to alert the driver to the onset of sleep so that the driver can take suitable precaution, such a taking a break from driving or resting for period. The alert may be displayed on display or otherwise communicated to the occupant (for example, via a message alert on a connected user device or via the vehicle communication system). The x-axis 814 of graph 803 is time. The y-axis 816 of graph 803 is volume displacement (the sum of depth changes over time).

The sleep onset feature can be considered as a feature detected in the physiological signal or in the depth data or in any corresponding video images. In general, the detection of safety and/or security events may correspond to detecting corresponding safety and/or security features in the depth data. Such safety and/or security features may correspond to learned features, for example, features learned by training a machine-learning derived model or other statistical features. The detection of said features may correspond to applying a pre-trained model or feature detection algorithm on the depth data or a further signal obtained from the depth data.

In a third example, the safety event corresponds to a reduction in quality of driving. A reduction in quality in driving may be detected by one or more movement events associated with the driver or passenger. For example, lurching movement or leaning of the driver may correspond to abrupt acceleration, braking or turning of the vehicle. Detection of one or more events in the depth data may correspond to a safety event and result in the alarm or alert being triggered.

In other embodiments, the quality of driving may be represented by a score and a reduction may correspond to a reduction in said score below a pre-determined threshold. The score may be calculated based on occurrences of the movement event described above. The quality of driving may reduce as the journey progresses and an appropriate alert triggered to make the driver aware that their driving quality has deteriorated so that they can take suitable precautions, such a taking a break or resting for period.

In a fourth example, the safety event corresponds to detection of incorrect use of vehicle safety equipment (for example, an incorrect fitting, installation or application) or a fault in vehicle safety equipment. In such an embodiment, a region of the depth image that contains the safety equipment is monitored to determine movement or position data for the safety equipment. In an example, the safety equipment is a seatbelt and the depth data representing the seat belt are processed to extract movement data for the seatbelt to determine a fault or incorrect application of the seatbelt.

In further embodiments, the system may monitor the occupant or a part of the vehicle during a crash or accident event.

In a first example, a vehicle sensor detects when a collision involving the vehicle is occurring occurred. For example, an on-board accelerometer may measure larger than expected g-forces, or unusually large breaking forces, or a combination of speedometer and accelerometer sensor output may indicate a reduction in speed without the accompanying breaking force. In such an event, the depth sensing camera may start monitoring the movement of the driver (and, any passengers) and their respiration rate or other relevant physiological information. The monitored movement data and physiological information may be transmitted to a further processor using an emergency notification system.

Such monitoring may also include detecting relative movement of an occupant, for example, a body part of the occupant. In further embodiments, the monitoring may also include determining a deceleration parameter for the occupant or an object in the vehicle by processing the depth data. For example, a deceleration parameter for a moveable object in the vehicle, such as a seatbelt, can be determined in the event of a crash. In further detail, depth data corresponding to a region of the depth image that includes the seatbelt is processed to determine movement data for the seatbelt. The movement data can include a deceleration parameter.

In a second example, depth data for the vehicle and a region moving relative to the vehicle (for example, a background region) may be analysed to determine deceleration of the vehicle itself during the crash.

In the above-described embodiments, the image capture device used for obtaining depth data is described as mounted or secured to an interior part of the vehicle (for example, the dashboard) and using the obtained depth data to monitor the driver of the vehicle. In a further embodiment, the image capture device has a mounting mechanism for mounting the device to a part of a moveable item that is used within the vehicle. In an example embodiment, the image capture device is used for obtaining depth data for a passenger of the vehicle to monitor the passenger.

Figure 9:
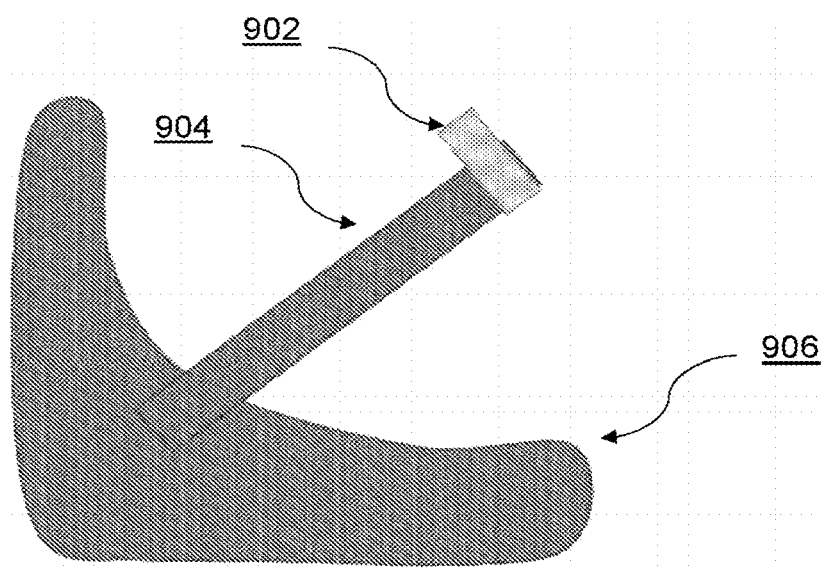
FIG. 9 is a diagram of a baby seat and image capture device secured to the baby seat, in accordance with various embodiments.

FIG. 9 depicts a schematic view of an image capture device 902 secured to a handle 904 of a baby seat 906. The image capture device 902 obtains depth data for the baby, when seated in the baby seat 906. An image capture device 902, suitably positioned, allows for monitoring of the baby. In such embodiments, further information may be obtained for the baby, for example, and may be monitored.

In such embodiments, depth data may be further processed to generate contextual information relating to the baby. For example, contextual data such as the presence of the baby inside the vehicle may be obtained from the depth data. Safety events related to the baby may also be detected, for example, safety events related to the baby being left unattended in the vehicle may be detected. As a first example, the depth data may be processed to determine the presence of the baby in the car. This may be combined with the detection that the vehicle has been stationary for an extended period of time (for example, using depth data or using signals from further sensors in the vehicle).

In a second example, contextual information obtained using a first depth sensing camera monitoring the driver and a second depth sensing camera monitoring the baby may be combined to detect that the baby has been left unattended. For example, the presence of the baby and the absence of another occupant corresponds to such an event. In a further example, the depth data may be processed to monitor the position or detect any movements of a baby or infant's head while the vehicle is being driven and an alert or alarm triggered in response to determining that the position or movement correspond to unsafe.

In related embodiments, the image capture device is secured to a pet carrier to provide a field of view of the pet during the journey. Depth data associated with the pet is then monitored to obtain relevant information about the pet. Other animals may be monitored using an image capture device secured to a suitable animal carrier.

For either pet of child monitoring, the depth data may be processed to obtain further information about the pet or child as part of a monitoring process. For example, physiological, in particular, respiratory monitoring or presence information may be obtained by processing the depth data.

In further embodiments, contextual information regarding the occupant and/or passengers may be combined with vehicle sensor data. For example, ambient conditions in the vehicle may be monitored (for example, the temperature) and the alert and/or alarm may be triggered in dependence on the ambient conditions. In such an embodiment, the alert and/or alarm may be triggered sooner when the measured temperature is higher.

In the above-described embodiments, image capture devices and associated depth sensors are described. In an embodiment, the image capture device detects light across the visible spectrum. In an embodiment, the camera detects light in only a portion of the visible spectrum, and/or in the infrared spectrum as well.

In the above-described embodiments, the system, for example, system 100 or system 200, have a display. The display is configured to graphical display depth images representative of the depth image. The display may also display one or more physiological parameters or graphically display the time-varying physiological signal.

The display may be further configured to overlay the depth image with colours representative of the determined physiological information. For example, the depth image may be represented over time using a colour change or other change in appearance of the depth image. For example, a first colour may be used for inhalation (for example, overlaying the part of the chest region moving towards the camera) and a second, different colour may be used for exhalation (for example, overlaying the part of the chest region moving away from the camera). Alternatively, a first visual aspect, for example, colour may be used to indicate inhalation only.

In an embodiment described above, facial signature data was obtained from the depth data as part of a facial recognition process. In related embodiments, the facial signature data may be processed to identify the occupant so that and information obtained about the occupant, such as physiological information, can be attributed to the correct user. In such embodiments, the occupant may have a profile or personal storage, and following the identification process, the obtained information may be allocated to the occupant's profile.

In some embodiments as described, the display is configured to graphical display the depth data, for example, as depth images. Together with the depth images, one or more visual indicators may be displayed together with the depth image. In addition to displaying graphical indicators for physiological information, other further information determined by processing the depth data may also be displayed. While a separate display and interface is described, it will be understood that, in some embodiments, the display and interface may be the display/interface of the vehicle (for example, the entertainment/navigation system).

While the embodiment of FIG. 1 depicts an occupant in a car, it will be understood that, in other embodiments, the vehicle may be any suitable vehicle. In further embodiments, the system may be integrated and/or connected to an emergency call system, such that the issuing of an alarm or alert is made via the emergency call system.

The systems and methods described herein may be provided in the form of tangible and non-transitory machine-readable medium or media (such as a hard disk drive, hardware memory, etc.) having instructions recorded thereon for execution by a processor or computer. The set of instructions may include various commands that instruct the computer or processor to perform specific operations, such as the methods and processes of the various embodiments described herein. The set of instructions may be in the form of a software program or application. The computer storage media may include volatile and non-volatile media, and removable and non-removable media, for storage of information such as computer-readable instructions, data structures, program modules or other data. The computer storage media may include, but are not limited to, RAM, ROM, EPROM, EEPROM, flash memory or other solid-state memory technology, CD-ROM, DVD, or other optical storage, magnetic disk storage, or any other hardware medium which may be used to store desired information and that may be accessed by components of the system. Components of the system may communicate with each other via wired or wireless communication. The components may be separate from each other, or various combinations of components may be integrated together into a medical monitor or processor or contained within a workstation with standard computer hardware (for example, processors, circuitry, logic circuits, memory, and the like). The system may include processing devices such as microprocessors, microcontrollers, integrated circuits, control units, storage media, and other hardware.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

The invention claimed is:

1. A method of non-contact monitoring of an occupant of a vehicle, the method comprising:
receiving depth data from at least one depth sensing device that has a field of view, wherein the depth data includes at least a first region of interest (ROI) associated with a chest area of the occupant and a second ROI associated with at least part of the interior of the vehicle, wherein the depth data represents depth information as a function of position across the field of view;
processing the first ROI of the depth data to generate a waveform associated with the occupant;
processing the second ROI of the depth data to determine movement information associated with the vehicle; and
based at least in part on the movement information, identifying a portion of the waveform for determining at least one physiological signal related to the occupant within the vehicle.

2. The method as claimed in claim 1, further comprising:
processing the depth data to obtain further information related to the occupant within the vehicle comprising at least one of:
contextual information;
identity information;
position information for the occupant within the vehicle;
position information for an object within the vehicle;
movement information for the occupant within the vehicle; or
movement information for the object within the vehicle.

3. The method as claimed in claim 1, wherein the method further comprises performing a monitoring process on at least one of the occupant or an object within the vehicle using at least one of the depth data or a further signal obtained by processing the depth data.

4. The method as claimed in claim 1, wherein the at least one depth sensing device comprises at least one of:
a depth sensing camera, a stereo camera, a camera cluster, a camera array, or a motion sensor.

5. The method as claimed in claim 1, further comprising:
sampling the physiological signal based at least in part on the movement information of the vehicle, wherein at least part of the sampling is performed in response to determining that the vehicle is at least one of substantially stationary, substantially moving at a constant speed, or substantially moving in a constant direction.

6. The method as claimed in claim 1, further comprising:
detecting a safety or security event based on the physiological signal; and
triggering an alert in response to detecting the safety or security event.

7. The method as claimed in claim 1, further comprising:
processing at least the depth data to obtain facial signature data for the occupant in the vehicle; and
using the facial signature data to determine that the occupant is an authorized occupant or an unauthorized occupant.

8. The method as claimed in claim 1, further comprising:
processing at least the depth data to obtain facial signature data for the occupant in the vehicle; and
using the facial signature data to attribute physiological data obtained by processing the depth data to the occupant.

9. The method as claimed in claim 1, further comprising:
processing at least the depth data to monitor for one or more events indicative of sleep onset.

10. The method as claimed in claim 1, further comprising:
processing at least the depth data to detect sleep onset based on an occurrence or a frequency of at least one of: yawning, an abrupt movement, a head position, or a position of another body part of the occupant.

11. The method as claimed in claim 1, further comprising:
processing the depth data to detect a reduction in a quality of driving by the occupant by monitoring at least one of: a relative movement or position of the occupant within the vehicle or a relative movement or position of an object within the vehicle.

12. The method as claimed in claim 1 further comprising processing the depth data to monitor safety equipment within the vehicle.

13. The method as claimed in claim 1, further comprising:
processing the depth data to monitor a position or a movement of a seatbelt to determine an incorrect application of the seatbelt.

14. The method as claimed in claim 1, wherein at least part of the depth data processing is performed in response to detecting an occurrence of an accident event.

15. The method according to claim 14, further comprising:
processing the depth data to monitor deceleration of at least one of the occupant or the seat belt.

16. The method as claimed in claim 1, further comprising:
securing the depth sensing device to child seat or a pet carrier, wherein the field of view of the depth sensing device includes at least part of a child within the child seat or a pet within the pet carrier; and
processing the depth data to monitor the child or the pet.

17. The method as claimed in claim 1, wherein the waveform is a volume waveform, and wherein the volume waveform is representative of an inhalation volume and an exhalation volume of the occupant over time.

18. The method as claimed in claim 1, the method further comprising:
sampling the physiological signal based at least in part on one of a position or a movement of the occupant within the vehicle, wherein at least part of the sampling is performed in response to determining that the occupant is substantially stationary.

19. The method as claimed in claim 1, wherein the physiological signal is representative of at least one of: respiration rate, pulse rate, tidal volume, minute volume, effort to breathe, oxygen saturation, or a breathing parameter.

20. A system for monitoring an occupant in a vehicle, the system comprising
at least one depth sensing device having a field of view including at least part of the interior of the vehicle, wherein the at least one depth sensing device is configured to generate depth data representative of depth information as a function of position across the field of view; and
a processor configured to process the generated depth data, the processor performing a set of operations comprising:
processing the depth data to generate a waveform associated with the occupant and movement information associated with the vehicle; and
based on the movement information, identifying a portion of the waveform for determining at least one physiological signal related to the occupant within the vehicle.

* * * * *